(12) United States Patent
Peterson et al.

(10) Patent No.: US 11,552,948 B1
(45) Date of Patent: Jan. 10, 2023

(54) DOMAIN MANAGEMENT INTERMEDIARY SERVICE

(71) Applicant: Amazon Technologies, Inc., Seattle, WA (US)

(72) Inventors: Alec H Peterson, Lake Forest Park, WA (US); Dana B Northcott, Bellevue, WA (US); Gregory M. DiBiase, Seattle, WA (US); Jon Heath Dixon, Seattle, WA (US); Jan Svab, Burnaby (CA); Rasam Hafezi, Maple Ridge (CA); Sean Meckley, Seattle, WA (US); Sairam Suresh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 16/831,576

(22) Filed: Mar. 26, 2020

(51) Int. Cl.
*H04L 9/40* (2022.01)

(52) U.S. Cl.
CPC ........ *H04L 63/0876* (2013.01); *H04L 63/102* (2013.01)

(58) Field of Classification Search
CPC .................... H04L 63/0876; H04L 63/102
See application file for complete search history.

(56) References Cited

U.S. PATENT DOCUMENTS

| | | |
|---|---|---|
| 6,356,986 B1 | 3/2002 | Solomon et al. |
| 6,606,677 B1 | 8/2003 | Okbay |
| 6,745,248 B1 | 6/2004 | Gardos et al. |
| 7,039,697 B2 | 5/2006 | Bayles |
| 7,299,299 B2 | 11/2007 | Hollenbeck et al. |
| 7,585,593 B2 | 9/2009 | Chang |
| 7,623,518 B2 | 11/2009 | Faulk, Jr. |
| 7,996,457 B2 | 8/2011 | Parsons et al. |
| 8,347,350 B2 | 1/2013 | Lum et al. |
| 8,612,565 B2 | 12/2013 | Schneider |
| 9,137,126 B2 | 9/2015 | Thomas |
| 9,203,846 B2 * | 12/2015 | Guccione .............. H04L 63/104 |
| 9,256,531 B2 | 2/2016 | Cho |
| 9,342,258 B2 | 5/2016 | Thanner et al. |
| 11,095,604 B1 * | 8/2021 | Gould ................. H04L 61/4511 |
| 11,175,839 B1 | 11/2021 | Volpe et al. |
| 2005/0078694 A1 | 4/2005 | Oner |
| 2007/0204087 A1 | 8/2007 | Birenbach |
| 2008/0154481 A1 | 6/2008 | Stroia |
| 2011/0106993 A1 | 5/2011 | Arinobu |

(Continued)

OTHER PUBLICATIONS

"Domain Name System Security Extensions", Dated Aug. 2, 2019, pp. 1-18.

(Continued)

*Primary Examiner* — Zkhoi V Le
(74) *Attorney, Agent, or Firm* — Robert C. Kowert; Kowert, Hood, Munyon, Rankin & Goetzel, P.C.

(57) ABSTRACT

An agent of a domain management intermediary service obtains a security key using a client credential indicated in a request for a read-write domain management operation. A registry credential is obtained using the security key, and the read-write domain administration operation is initiated using the registry credential. A separate read-only agent obtains the completion status of the read-write domain administration operation and provides the status to the client.

20 Claims, 10 Drawing Sheets

(56) References Cited

U.S. PATENT DOCUMENTS

| | | |
|---|---|---|
| 2014/0230027 A1* | 8/2014 | Cha ...................... H04L 61/302 |
| | | 726/5 |
| 2015/0082449 A1 | 3/2015 | Mushkatblat |
| 2015/0095623 A1 | 4/2015 | Ermolaev et al. |
| 2016/0205097 A1* | 7/2016 | Yacoub ............... H04L 61/4511 |
| | | 726/6 |
| 2017/0139852 A1 | 5/2017 | Xu |
| 2017/0255575 A1 | 9/2017 | Niu |

OTHER PUBLICATIONS

Wikipedia, "Extensible Provisioning Protocol", Retrieved from https://en.wikipedia.org/wiki/Extensible_Provisioning_Protocol on Aug. 2, 2019, pp. 1-8.

Amazon Web Services, "AWS Key Management Service Cryptographic Details" dated Aug. 2018, pp. 1-42.

"Amazon Route 53: Developer Guide", dated Apr. 1, 2013, pp. 1-545.

IBM NN8806396, "Interrupt Pulse Mask Enable," IB< Technical Disclosure Bulletin, Jun. 1988, pp. 1-4.

U.S. Appl. No. 16/660,704, filed Oct. 22, 2019, Thomas A. Volpe et al.

U.S. Appl. No. 16/660,716, filed Oct. 22, 2019, Thomas A. Volpe et al.

* cited by examiner

DOMAIN MANAGEMENT INTERMEDIARY SERVICE

BACKGROUND

In recent years, more and more organizations enable their customers to interact with the organizations using computer servers accessible via the World Wide Web. A given organization may acquire the rights to use one or more domain names (e.g., domain names ending in ".com", ".net", etc.) using a process defined by an organization called the Internet Corporation for Assigned Names and Numbers (ICANN). ICANN is responsible for coordinating the maintenance of databases related to the namespaces and numerical spaces of the Internet, and thereby helping to ensure the Internet's stable and secure operation. Much of ICANN's work is concerned with the Internet's global Domain Name System (DNS), including policy development (e.g., to help internationalize DNS), introduction of new top-level domains, and the operations of root name servers. The numbering facilities ICANN manages include the Internet Protocol (IP) address spaces for IP version 4 and version 6, and the assignment of address blocks to regional Internet registries.

In order to begin using a particular domain name for its operations, an organization or entity needs to register the domain name with a domain name registry operator accredited by ICANN, or other organizations which authorize the registration of country code top-level domains. The domain name registry operator is often referred to simply as a registry, and the organization or entity on whose behalf domain names are registered is referred to as a registrant. The domain name registry operator maintains a database of domain names for which it is responsible, and associated registrant information. In order to register new domain names ending in any given top-level domain such as ".com", and/or to perform administrative tasks regarding such registrations (such as extending/renewing the registrations, changing name servers, etc.), interactions with the registry for that top-level domain may be required. Traditionally, such interactions with registries are handled on behalf of registrants by business entities referred to as registrars.

Over time, as more and more customers or clients of an organization start using the domain name(s) registered by the organization, the domain names tend to become closely linked to the identities or brands of the organization, and as such become more and more valuable from the perspective of the organization. If the name servers associated with an organization's registered domain names are somehow incorrectly configured, or other types of undesired administrative changes pertaining to the domain names are made (e.g., as a result of a network attack), the business activities of the organization may potentially be hampered significantly, and the organization may suffer reputational damage.

Figure 1:
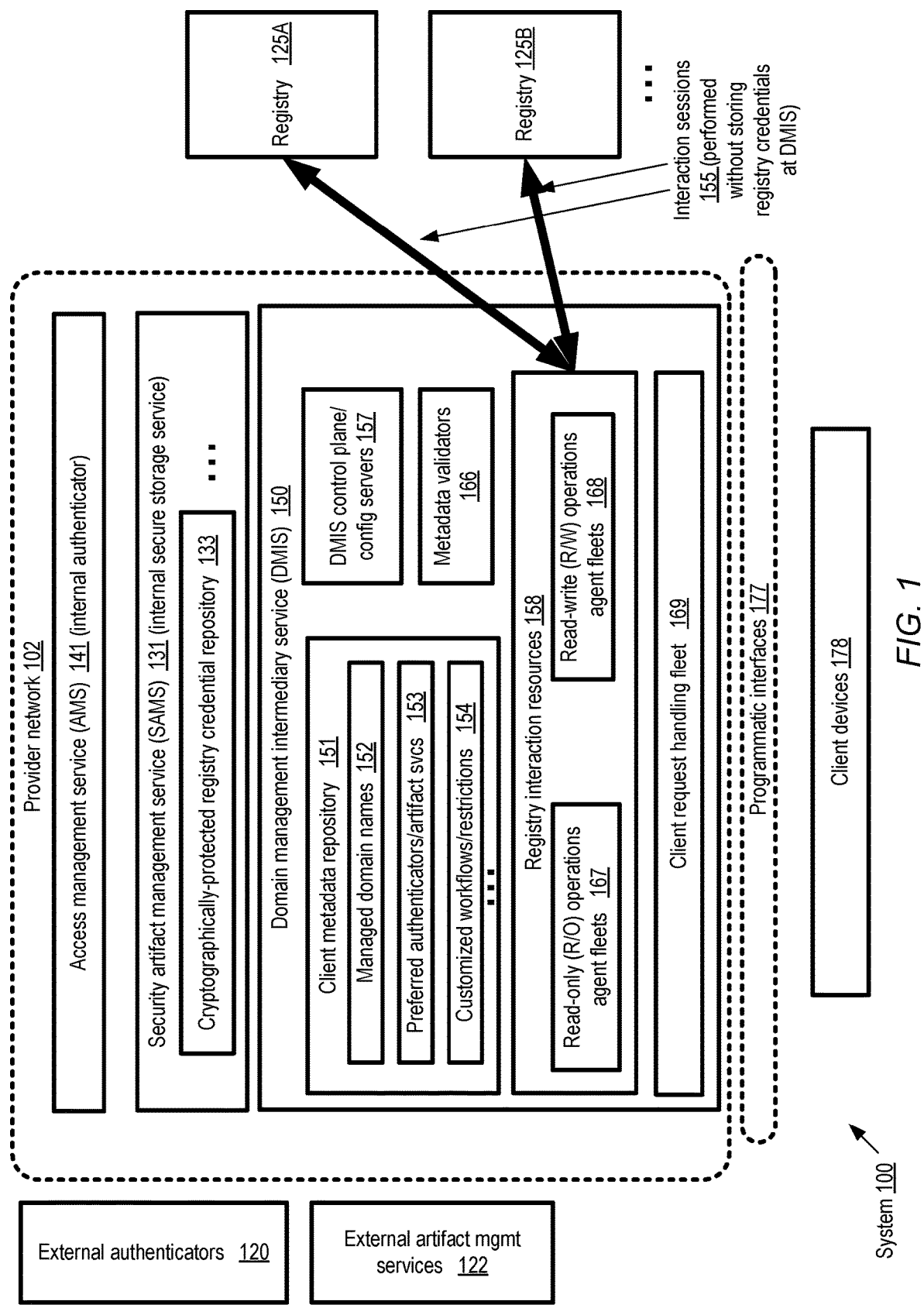
FIG. 1 illustrates an example system environment in which a domain management intermediary service enabling isolation of registry-provided credentials may be implemented at a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing security enhancement techniques for domain administration at a network-accessible service that acts as an intermediary between domain registrants and registries are described. Such a network-accessible service may be referred to as a domain management intermediary service (DMIS). A registry may comprise an organization accredited by an organization such as ICANN and authorized to maintain databases pertaining to one or more collections of domain names—e.g., one registry may be set up for domain names ending in ".com", another registry may be set up for domain names ending in ".org", and so on. The owner of a registered domain name (e.g., a business or government organization) is referred to as a registrant of that domain name.

Traditionally, entities (typically third parties) called registrars, also accredited by organizations like ICANN, interact with registries on behalf of registrants; from the perspective of a registry, the only entity which has the rights to manage a domain name is the registrar. When an operation such as a transfer or registration of a domain name is to be performed, a registrar identifies itself to the appropriate registry using a set of credentials (such as a password or cryptographic certificate, etc., obtained earlier from the registry). These credentials establish trust between the registry and the registrar, and permits the requested operations to be completed; as such, the entity that controls a set of registry-supplied registrar credentials in effect controls all the domains registered using those credentials. This traditional approach has some weaknesses from the information security standpoint. A single registrar may be provided just one set of credentials by a registry, which may then be used to manage domains for all of the registrar's customers (the registrants on whose behalf the registrar acts as an intermediary). The credentials may be stored within the registrar's computing and storage systems. The domain names themselves may be extremely valuable from the perspective of the registrants, as they may be closely tied with the services provided by the registrants to the registrants' own end customers, and to the registrants' business reputation. The risks associated with storing shared credentials for multiple domain names at or by a single registrar include the following: (a) credentials may potentially leak (i.e., be acquired by unauthorized parties) from the registrar's resources; (b) registrar software may become compromised; (c) registrar operational staff may become compromised and misuse the credentials; (d) bugs in the registrar's systems may potentially lead to registry operations on domains other than the ones on which the operations were requested by registrants and/or (e) the registrants depend fully on their registrar, so an outage at the registrar's systems may render a registrant incapable of initiating desired domain related changes.

To address such potential vulnerabilities, a domain management intermediary service (DMIS) which supports a number of techniques to isolate registry-provided credentials, and hence enhance the overall security of domain name administration tasks, may be implemented in various embodiments. From the security perspective, the DMIS does not have to store registry-provided credentials; instead, these credentials are stored by the registrants themselves, for example, at security artifact management services which are independent of the DMIS itself. The registrant must become accredited as a registrar in a legal sense (signing accreditation agreements with registries and obtaining/storing credentials) in at least some embodiments, but may rely on the DMIS to interact with the registry. In effect, in this new arrangement, traditional registrar functions can be considered to be split between the registrant and the DMIS. Such registrants may be referred to as clients of the DMIS. In some embodiments, a client of the DMIS may interact directly with a registry to obtain the registry credentials needed for various types of domain administration operations; in other embodiments, the client may interact with a registry through a different intermediary (not the DMIS) to obtain the registry credentials. At a high level, the DMIS may perform the following kinds of domain management tasks on behalf of a client in various embodiments: (a) the DMIS may set up highly-available, single-tenant agent groups to perform the domain management operations requested by a given client; (b) the registrant may submit requests for various types of domain management operations to the DMIS, (c) the DMIS may utilize authorization mechanisms selected or set up by the registrant, e.g., using highly trusted network-accessible services which have been proven secure for numerous other types of functions over years, to temporarily acquire the credentials needed to initiate the operations, (d) the DMIS may initiate the requested operations at the registry on behalf of the registrant using the credentials, (e) the DMIS may report back to the client regarding the status of requested operations, and (f) the DMIS may also perform a number of additional tasks unrelated to specific requests, such as forwarding registry-generated messages, periodically or on demand verifying that the metadata maintained for the clients at the registry remains valid, and so on. In at least some embodiments, a separate fleet of agents may be set up at the DMIS for performing modification or read-write operations at a registry than the fleet set up for read-only operations, and different security mechanisms may be employed for read-write operations (operations which, if successful, result in modifications, additions or deletions at the databases maintained at the registry) than for read-only operations (operations which do not require changes at the databases maintained at the registry). As a result of the use of the DMIS, most or all of the kinds of security-related risks mentioned above may be mitigated or eliminated, and a highly available and scalable set of resources may be used by registrants to manage their domains names. The terms "domain name management", "domain name administration", "domain management" and "domain administration" may be used interchangeably herein as dictated by context.

Various embodiments may be capable of achieving various advantages and practical applications/benefits, including some or all of the following: (a) substantially reducing the probability of misconfiguration of domain names, name servers and the like that may be required for the success of Internet-accessible applications of the registrants, (b) enhancing the user experience of individuals within the domain registrants' organizations responsible for domain configuration-related tasks, e.g., by providing easy-to-use interfaces for issuing administrative requests for domain names, obtaining audit records of such requests as well as records of accesses to registry-supplied credentials, etc., (c) reducing, by allocating highly-available and scalable resources to each registrant, the probability of scenarios in which urgent domain management tasks cannot be completed, and (d) providing customizable security levels with respect to registry-provided credentials, e.g., with the help of client-specified workflows and restrictions on permitted operations.

According to some embodiments, the DMIS may be implemented as part of a suite of services of a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In at least some embodiments, the DMIS and the registrants may utilize a number of other services of the provider network, such as a security artifact management service, an access management service, and the like. Administrative tasks may be performed by the DMIS for several different levels of domains in some embodiments, including but not limited to generic top-level domains (gTLDs), country code top-level domains (ccTLDs), and third-level domains (e.g., with domain names of the form "X.Y.com", "X.Y.edu" etc.).

In order to utilize a DMIS for domain name management, a client may have to participate in a preliminary setup procedure, involving communications between the client, the registry used for the domain name(s) of the client, and the DMIS itself in various embodiments. During this setup procedure, registry-provided credentials for administering the domain names may be acquired by the client, and a set of authorization-related configuration operations may be performed, as discussed below in further detail. After the preliminary procedure has been completed, the client may begin sending requests for domain management operations to the DMIS, and the DMIS may begin fulfilling the requests (and also serving as a conduit for communications initiated by the registry and directed to the client), without the registry-provided credentials ever being stored within the DMIS or at storage devices accessible from the DMIS in various embodiments.

According to some embodiments, a system may comprise one or more computing devices, e.g., configured at a domain management intermediary service (DMIS) of a provider network. The computing devices may include instructions that upon execution on or across one or more processors cause the devices to establish, at the DMIS (a) a first set of one or more agents to perform read-write domain administration operations on behalf of a client; and (b) a second set of one or more agents to perform read-only domain administration operations on behalf of the client. In at least some embodiments, respective agents may be set up at respective hosts, with each host being assigned a respective network address (e.g., an Internet Protocol or IP address) which may be whitelisted by a domain name registry as part of a preliminary setup procedure. Messages received from a whitelisted address may be treated as legitimate and processed, while at least some messages from non-whitelisted addresses may be discarded without further processing at the registry in at least some embodiments. In various embodiments, the agents may be configured in single tenant mode at the DMIS—that is, separate or non-overlapping pairs of agent sets (one set for read-write operations, and one set for read-only operations) may be set up for respective clients.

In response to a programmatic request from a given client for a read-write domain administration operation, a particular agent of the read-write set of agents may perform the following tasks in various embodiments. First, the particular read-write agent may generate a short-validity-duration security key (SVDK) using a client credential indicated in the programmatic request. Such a short-validity-duration security key may for example, be limited in its validity for a few seconds or a few minutes in some embodiments, and may be obtained from an authorization service which is used by and/or selected by the client. In one implementation, the SVDK may remain valid for the duration of a session of interactions on behalf of the client, with the duration being tunable or selectable by the client. Using the SVDK, the read-write agent may retrieve a registry credential which was stored earlier by or at a security artifact management service or repository on behalf of the client. The term "registry credential" may be used generically herein to refer to registry-provided credentials which can be used to initiate various types of domain administration operations. In some embodiments, a registry may provide two types of credentials: read-write credentials, which can be used for requesting modification or read-write (R/W) operations such as transferring or creating domain names, and read-only credentials, which can be used for read operations such as checking for registry-generated messages and the like. In other embodiments, at least some registries may only provide a single type of credential, referred to herein as common credentials, which can be used for both R/W and R/O operations. If the registry offers both types of credentials, the SVDK may be used to obtain the R/W credentials stored earlier; otherwise, the common credentials may be obtained by the R/W agent from the artifact service.

The obtained registry credential may then be used by the R/W agent to initiate the requested R/W operation at the targeted registry in various embodiments. In at least some embodiments, at least some registries may not provide a synchronous response to at least some types of operation requests; instead, information regarding the status of the requested operation (e.g., whether the operation was completed successfully, is in progress, has failed, etc.) may be provided asynchronously, in the form of messages posted to or inserted at a message queue by the registry. An agent selected from the read-only set of agents may be responsible for performing a read operation (e.g., by polling or checking contents of the message queue) to determine the status of the requested R/W operation, and the status may be provided to the client on whose behalf the R/W operation was initiated by the DMIS in at least some embodiments. Other asynchronous communication mechanisms may be used in some embodiments instead of message queues: for example, the registry may send a message via a secure communication channel to an R/O agent in one embodiment if/when the status of the R/W operation changes. In some embodiments, in order to perform its tasks, an R/O agent may require registry credentials (e.g., read-specific credentials or common credentials, depending on the registry). In at least one such embodiment, the client may create a special authorization role for R/O agents (e.g., using an authorization service of the client's choice), and enable agents granted that role to access the needed credentials from the artifact service or repository on behalf of the client. Such an authorization mechanism for read-only operations may be performed during the preliminary setup phase of interactions with the DMIS in various embodiments. Other types of permission granting mechanisms may be used in some embodiments by clients to enable R/O agents to access registry credentials on the client's behalf as needed.

In some embodiments, at least the following types of additional security controls may be set up for the read-only fleets: (a) network isolation techniques may be utilized to ensure that connectivity to unauthorized endpoints is limited, (b) no secure shell (SSH) access may be provided to the read-only agents, (c) the resources used for the read-only agents may be checked to ensure that software usable to perform read-write registry operations is not installed at the resources, (d) a strictly controlled software development pipeline may be used to ensure that only a limited set of software capable of only read operations at registries is installed, (e) at least two team members (e.g., software developers, security experts, domain administration experts, etc.) may be required to approve any given change to the software code of the read-only agents, and (f) the servers used for hosting the read-only agents may be placed in physically-secured locations. Similar enhanced security techniques may be used for read-write agents in at least one embodiment.

In embodiments in which the set of R/W agents established for a given client includes multiple agents, any of various techniques such as random selection, round-robin selection, load-balancing based selection, or the like may be used to select the particular R/W agent to be used for a given client-submitted R/W request. Similar techniques may be used to select the particular R/O agent responsible for checking the status of the R/W operation in various embodiments. In some embodiments, separate R/W and R/O agent pools may not be required, and a single set of agents may be used, with a respective selected agent performing the work required for initiating an R/W operation and/or for performing read/only tasks as needed. In at least some embodiments, the agents at the DMIS that are going to be used for a given client may be established during the preliminary or setup procedure, and the network addresses of the R/O and R/W agents may be provided to the client during the setup procedure. The client may request the registry to whitelist the addresses, so that messages sent to the registry from the agents are not rejected in such embodiments. Any of a number of different protocols may be used for submitting operation requests and obtaining status information or other messages (e.g., by the R/W and/or R/O agents) in different embodiments—e.g., the Extensible Provisioning Protocol or EPP may be used in some embodiments. In one embodiment, secure network connections (set up, for example using SSL (Secure Sockets Layer) or TLS (Transport Layer Security)) may be established between DMIS agents and a registry, and then an EPP session may be established using messages exchanged via the secure network connection.

In addition to the processing and fulfillment of R/W requests as described above, a DMIS may perform a number of other types of tasks for its clients in different embodiments. For example, the DMIS may maintain a set of metadata pertaining to the domain names being managed on behalf of a client, such as the names of the domains, contact information (i.e., who is to be contacted for information regarding the domains), email addresses to which reports of potential abuse of the domain (e.g., for suspected spam email, phishing and the like) are to be sent, timestamps indicating when a domain name expires, when a domain name was created or last modified, and so on. A registry may also maintain its own copies of such metadata for the domain names for which the registry is responsible. In at least one embodiment, the DMIS may periodically issue a read request to the registry for the metadata pertaining to a given domain name, and check whether the version of the metadata received from the registry matches the version maintained at the DMIS itself. If a mismatch is detected, the client may be informed by the DMIS, as this may indicate that some corrective action needs to be taken at the DMIS, the registry, or both.

To further enhance the security protocols for at least some types of domain administration operations, a DMIS client may specify custom workflows to be implemented before a request for such an operation is sent to a registry: e.g., programmatic approval from multiple authorized users may have to be obtained for some requests, or a mandatory delay of a specified amount of time may have to be enforced between the time that the request is first received at the DMIS from a client and the time that the request (or a modified version of the request) is forwarded to the registry. In one embodiment, a client may indicate exceptions to normal operating procedures regarding domain administration: e.g., while domain name related changes may be acceptable during most business hours, a client may request that no changes be made to a set of domains during periods of specified durations immediately prior to specified special events or holidays. In at least some embodiments, the DMIS may maintain an audit log of all the operations performed on behalf of various clients, including exactly when and how often registry credentials were obtained by DMIS agents, and such logs and/or associated metrics (e.g., the rates at which respective types of R/W operations were attempted) may be provided to clients if desired. Various configuration parameters for domain management operations may be modified at the DMIS in response to programmatic requests in some embodiments, such as the rate or frequency of polling registry message queues, the number of R/W or R/O agents to be configured for a client, and so on.

In some embodiments, the DMIS may provide multiple user interfaces which can be used for submitting administrative requests, configured using independent resources and network pathways, such that correlated failures cannot occur for all the interfaces. Such interfaces may include a "normal mode" or "default mode" set of interfaces, and an "emergency" or "backup" set of interfaces which may be used if the normal mode set of interfaces are inaccessible or unavailable. As a result of the combination of techniques introduced above, the probability of unwanted domain administration operations being performed at a registry, as well as the probability that a legitimate request cannot be sent to a registry, may be minimized in various embodiments. In at least one embodiment, a DMIS client may specify or choose one or more authenticators, independent of the DMIS, to be used to authenticate domain administration requests purportedly sent to the DMIS by the client. Note that in some embodiments, an administrative request may be transformed at the DMIS before it is sent on to the registry—for example, the request may be received from the client at the DMIS in plain text, or using a user-friendly command syntax supported by the DMIS, and converted into EPP (Extensible Provisioning Protocol) (or some other protocol) at the DMIS before it is transmitted in to the registry.

In some embodiments at least three independent subsystems or services, without centralized control being vested in any one of the subsystems, may be used together for sending domain administration operation requests on behalf of a given DMIS client to a registry: (a) a repository or service for security artifacts, at which the registry-supplied credentials are stored by or on behalf of the client, (b) a set of client-selected authentication mechanisms, and (c) the DMIS itself. The DMIS may not be permitted to store the registry-supplied credentials at any type of resource in various embodiments, and in some cases may not even be able to access plain-text versions of the credentials. Similarly, the artifact repository or service operator may have no access to, or information about, the resources (with whitelisted IP addresses agreed upon with the target registries) used for the network connections to the registries. In addition, the authentication mechanisms or services may have no access to the credentials or the resources used for the network connections with the registries. An intruder may thus have to penetrate the defenses of all three subsystems to successfully cause an unwanted domain name administration operation.

As mentioned earlier, in some embodiments clients may specify custom workflows for some types of domain administration operations. In one such embodiment, a client may use a programmatic interface of the DMIS (e.g., a graphical workflow design interface) to specify the custom workflow to be implemented at the DMIS before sending a representation of a request for the operation to a registry on behalf of the client. For example, the custom workflow steps may include verifying that an approval of the request has been programmatically obtained from one or more entities other than the submitter of the request, such as a supervisor of the submitter, and so on. Such multiple approval requirements may be set up for administrative operations that affect mission-critical operations of the registrant's organization for example. In one embodiment, a custom workflow indicated by a client for a particular types of administrative operation may include a step in which the DMIS notifies a set of users about a proposed operation using specified notification mechanisms (e.g., text messages, e-mails, phone calls or the like), and/or prompts such users to approve the operation. The DMIS may implement one or more programmatic interfaces in some embodiments, which may be used by clients to submit requests of various types (e.g., requests to specify custom workflows of the kind mentioned above) to the DMIS and receive corresponding responses. Such interfaces may include, for example, one or more web-based consoles, a set of application programming interfaces (APIs), command-line tools, graphical user interfaces such as workflow design tools, and the like.

The domain administration requests handled by the DMIS on behalf of its clients may pertain to domains at various levels of the DNS hierarchy in some embodiments. For example, some requests processed by the DMIS may pertain to gTLDs managed by registries accredited with ICANN, others may pertain to country code TLDs, lower-level domains such as third-level domains (e.g., domains of the form "X.Y.com") or to a combination of domains of different types. Any of a wide variety of administrative operation types may be requested using the DMIS in different embodiments, such as (but not limited to) (a) a request to modify a name server associated with a particular domain, (b) a request to register or unregister a domain, (c) a request to update a configuration setting of a domain, (d) a request to renew registration for a domain, (e) a request to restore an expired domain, (f) a request to transfer a domain to some other registrant, (g) a request to re-send an authorization or confirmation communication, (h) a request to configure DNSSEC (Domain Name Service Security Extensions) for a domain and/or (i) a request to lock/unlock a domain. In some embodiments, a client may utilize the DMIS for some types of administrative tasks for some domains, but not for other types of administrative tasks or other domains.

Example System Environment

FIG. 1 illustrates an example system environment in which a domain management intermediary service enabling isolation of registry-provided credentials may be implemented at a provider network, according to at least some embodiments. As shown, system 100 may comprise resources and artifacts of several network-accessible services of a provider network 102, including domain management intermediary service 150, a security artifact management service (SAMS) 131, and an access management service (AMS) 141. The provider network 102 may also implement various other services, including for example one or more types of virtualized computing services, one or more storage or database services, and the like, which are not shown in FIG. 1.

The DMIS 150 may act as a secure intermediary between registrants (entities or organizations which have registered their Internet domain names, or wish to register Internet domain names) and one or more registries 125 (such as registry 125A or 125B) in the depicted embodiment. The registrants may be referred to as the clients of the DMIS. A registrant may submit various types of programmatic requests pertaining to domain name administration to a request handling fleet 169 of the DMIS 150 from a client device 178 (e.g., a desktop, laptop, mobile computing device or the like) via programmatic interfaces 177 in the depicted embodiment, and the DMIS may in turn forward the requests (or transformed versions of the requests) on to the appropriate registries 125 (e.g., 125A or 125B) on behalf of the client. Programmatic interfaces 177 may include, among others, one or more web-based consoles, a set of APIs, command-line tools, graphical user interfaces, audit log viewing interfaces, and the like in different embodiments. In some embodiments, to simplify the tasks that have to be performed by DMIS clients, a user-friendly command language for domain administration operations may be implemented at the DMIS; the DMIS clients may use such a command language in the requests they submit via programmatic interfaces 177, and the DMIS may transform the requests into a format understood by the registries. Clients may store registry-provided credentials at services or locations of the clients' choice, e.g., at a cryptographically-protected registry credential repository 133 of a security artifact management service (SAMS) 131 within provider network 102, or at external artifact management services 122 which are operated independently of the provider network.

The DMIS 150 may comprise a set of control plane or configuration servers 157 for managing the resources used for implementing client-submitted requests and associated metadata in the depicted embodiment; the remaining elements of the DMIS 150 may be considered part of the DMIS data plane. A collection of registry interaction resources 158, organized as separate fleets of read-only operation agents 167 and read-write operations agents 168 may be set up at the DMIS 150 in various embodiments. The DMIS 150 may also include a client metadata repository 151, at which information pertaining to managed domain names 152, clients' preferences 153 regarding authenticators and artifact services to be used for operations requested by the clients, as well as custom workflows and/or operation restrictions 154 specified by clients may be stored in at least some embodiments. Note that at least in some embodiments, one or more types of domain name administration operations (such as transfers of domain names), may not be permitted using the DMIS on behalf of at least some clients, at least temporarily, and information about such prohibited types of operations may also be stored in the metadata repository. In one embodiment, a single fleet of agents may be set up for a client, and may be used to perform both read-write and read-only domain administration operations. The DMIS 150 may also include one or more metadata validators 166 in some embodiments, which may be responsible for checking whether at least some domain related metadata stored on clients' behalf at registries 125 matches corresponding metadata stored in the repository 151. Various components of the DMIS and other services, including R/W and R/O agents, the client request handling fleet 169, metadata validators 166, control plane servers 157 as well as the metadata repository 151 may be implemented using a combination of software and hardware of one or more computing devices in the depicted embodiment.

According to various embodiments, clients of the DMIS may receive registry-supplied credentials (such as passwords, security keys, certificates and the like) from registries 125, to be used when various types of domain name related operations are to be performed on behalf of the client. A client may cause the credentials to be stored at an artifact management service such as SAMS 131 (within the provider network 102 and hence referred to as an internal secure storage service), or at external artifact management services 122, in various embodiments. The choices of where to store the registry-supplied credentials for operations on a given domain may, if/when to move the credentials from one location to another, the manner in which the credentials are to be encrypted (if they are to be encrypted), etc., may be left entirely up to the client in the depicted embodiment. The DMIS 150 may have no responsibilities with respect to such choices, as long as the client is able to inform the DMIS regarding mechanisms (such as mechanisms utilizing authenticators within or outside the provider network) that can be used to successfully extract the credentials when needed on behalf of the client in the depicted embodiment. Even though the DMIS 150 may utilize registry-supplied credentials on behalf of clients for specific operations, the DMIS may not store the credentials (e.g., within the DMIS, or at storage devices accessible form the DMIS and controlled by the DMIS) in various embodiments. One or more authenticators may be used to manage access to the registry-supplied credentials in the depicted embodiment, such as for example an access management service (AMS) 141 (an internal authenticator), or one or more external authenticators 120. In some embodiments, multiple authenticators may be used for at least some types of domain administration operations.

In some embodiments, a client may participate in a setup procedure (discussed in greater detail below in the context of FIG. 3) involving programmatic communications with the DMIS (e.g., control plane servers 157) as well as the registries before the DMIS is enabled to act as an intermediary for specific domain administration requests. During the setup procedure, respective sets of R/O agents and R/W agents may be set up on behalf of the client, authorization roles to be utilized by at least some of the agents may be created on behalf of the client at the client's preferred authenticator(s), network addresses of the agents may be whitelisted at the registries 125 at the request of the client, and so on.

After the setup phase is complete, a client may begin submitting various types of domain administration requests to the DMIS 150 via programmatic interfaces 177. The requests may be processed initially at the request handling fleet 169. Depending on the specifics of a given request, an internal version of the request (or the original request itself) may be sent by the request handling fleet 169 to any of three types of DMIS components: an R/W agent from the set of agents established for the requesting client, an R/O agent, or a control plane server. The specific agent to be used from the set configured for the client may be selected using any of various techniques, such as random selection, round-robin selection, load balancing algorithms and the like in different embodiments.

A client's request may include or indicate a credential, e.g., credentials used for performing operations associated with the client's account at the provider network 102 and/or at external services such as authenticators 120 or external artifact management services 122. In the case of a request for an R/W domain management operation (such as a request to create or transfer a domain), the R/W agent to which the request is assigned may first use the client's credential to obtain a second credential (e.g., from the AMS 141 or an external authenticator 120) which can be used to access artifacts for a short time from the artifact management service which the client has selected for storing the client's registry-provided credentials. In at least some embodiments, such a second credential may be referred to as a short-validity-duration key (SVDK), and the SVDK may only be usable for a configurable time period (which may in some cases be set by the client). Using the SVDK, the R/W agent may extract the required registry credential from the artifact management service (e.g., SAMS 131 or external artifact management service 122), and submit a request for the R/W operation to the targeted registry in various embodiments. The R/W agent may also notify one or more of the R/O agents established for the client that the R/W request has been sent to the registry.

In at least some embodiments, instead of providing an immediate or synchronous response indicating the status of the R/W request, a registry 125 may use an asynchronous communication mechanism such as a message queue to provide the status information. In some such embodiments, an R/O agent (e.g., one informed by the R/W agent) may periodically access or poll such a message queue, obtain information about changes of the status of the R/W operation, and provide the status information to the client via programmatic interfaces 177. In some embodiments, R/O agents may already be polling such message queues to capture any of various types of communications from the registries to the clients, so the R/W agent may not have to notify an R/O agent when the R/W request is sent to the registry.

Any of a variety of communication protocols supported by registries 125, such as EPP, may be used for communications between the agents and the registries 125 in different embodiments. In some embodiments, secure lower-level communication channels, such as TLS sessions, may be set up, and the higher level protocols such as EPP may be used to perform domain-name specific operations using the secure channels. In at least one embodiment, e.g., based on a credentials management policy, the registry credentials utilized on behalf of a given client or registrant may have to be rotated or replaced periodically after some selected time interval. In one such embodiment, the DMIS may help facilitate such credential rotation, e.g., by requiring/reminding the registrant to change the credentials, or by actively causing the credentials to be modified (e.g., using one or more messages sent to the registry on behalf of the client).

For some types of requests submitted by clients via programmatic interfaces 177 (e.g., requests related to client preferences, tuning changes and the like, or requests for statistics or logs maintained at the DMIS itself) communications with the registry may not be required. Instead, such requests may be forwarded to the DMIS control plane 157 for implementation by the request handling fleet 169. If the configuration requests are found acceptable, the requested changes may be made (which may involve changing some of the information stored in client metadata repository 151), and a response may be provided to the client from the control plane servers. Examples of such configuration requests are provided and discussed in further detail below, e.g., in the context of FIG. 6.

In at least one embodiment, metadata verifiers 166 may obtain (e.g., using a client's R/O fleet) representations of the domain-related metadata stored at a registry for a DMIS client, and compare that metadata with the version of the corresponding information stored within repository 151. If there is a mismatch between the two versions of metadata, a notification may be sent to the client via programmatic interfaces 177.

A variety of authentication mechanisms (or combinations thereof) may be used to verify that a given administrative request for a domain name was actually issued by the client by which the request was purportedly sent in different embodiments. In some cases, the client may use authenticators implemented at the AMS 141 of the provider network. In other embodiments, one or more external authenticators 120 may be specified by the client. In some cases, multi-factor or multi-step authentication may be required for at least some domain administration tasks. Details of the preferred authenticators and authentication mechanisms may be stored in the client metadata repository 151 of the DMIS in various embodiments. In various embodiments, the authenticators may be independent of the DMIS—that is, the authentication process used for client-submitted requests may not be controlled by or modifiable by the DMIS itself. Thus, for example, the DMIS 150 may not be permitted to override an authentication decision made at the authenticators.

According to some embodiments, a client may specify customized workflows for at least some types of administrative requests to be initiated on the client's behalf by the DMIS 150. Such customized workflows may for example indicate additional steps to be taken between the time that a request submitted by the client is received at the DMIS, and the time that the DMIS sends a representation of the request on to the registry. Such steps may include obtaining approvals (e.g., via selected programmatic interfaces) from one or more entities other than the submitter of the request, waiting for a specified time period before sending the request to the registry, and so on. Such workflows may also be stored in the client metadata repository 151 in the depicted embodiment.

In some embodiments, distinct registry-supplied credentials may be stored at an artifact service (such as SAMS 131) for R/W operations versus R/O operations to be performed for a given client or a given domain name. In other embodiments, a common set of credentials may be used for read operations as well as modifying or R/W operations, so the same credentials may have to be obtained by both the R/W agents and the R/O agents. In at least some embodiments, individual agents may be established at respective hosts in a single-tenant manner—that is, a given host may be employed for a single agent of a single DMIS client, and the host's resources may not be shared by any other agent or for any other client. In some such embodiments, a number of additional security precautions may be taken with regard to the agents—e.g., the hosts may be located in special physically isolated rooms, no access to the public Internet may be permitted from the hosts (except to the registries 125), every network message received at or transmitted from an agent may be logged and analyzed, and so on.

In some embodiments, a registry-supplied credential may be used to establish a communication session 155 between an agent and a registry, e.g., using EPP over SSL/TLS. In other embodiments, the registry-supplied credential may not necessarily be required to establish a session, but may be passed to the registry during the session. Using the credentials at one or more stages of the session, a representation of a requested particular administrative operation may be sent to the registry on behalf of the client, without actually storing the credential at the DMIS itself in various embodiments. Upon receiving the request, the registry 125 may initiate corresponding internal operations if the request is found to be acceptable, such as updating one or more domain-related databases maintained at the registry in the case of an R/W request.

Secure artifact management service (SAMS) 131 may include or utilize a fleet of hardware security modules (HSMs) in some embodiments. The HSMs may be implemented at the SAMS itself, or at a separate cryptographic security service invoked from the SAMS. APIs supported by the SAMS or the cryptographic security service may include, among others, createCMK (to create client master keys or CMKS), putArtifact (to store client data in encrypted form using a client master key), getArtifact (to retrieve an artifact), verifyArtifactExists (to verify whether an artifact such as a registry-supplied key exists for a given client) and so on. In some embodiments, the SAMS may operate as a cryptographic service provider for protecting data, offering (among other features) integration of key management for other services of the provider network 102 (including the DMIS, virtualized computing services, various storage services, database services and the like), centralized management of security artifacts (credentials, tokens, keys, passwords and the like), and auditing.

A distributed fleet of FIPS (Federal Information Processing Standard) validated HSMs may be used to perform cryptographic operations on behalf of SAMS clients in the depicted embodiment. For a given client of the SAMS (such as a domain name registrant or DIMS client), an HSM-based cryptographic hierarchy may be established, rooted under one or more client master keys (CMK) created on behalf of, and at the request of, the client. Access control policies may be defined to indicate which entities can manage or use individual CMKs in some embodiments. In some embodiments, requests to SAMS 131 may be made using the TLS protocol with a cipher suite that provides forward secrecy, a feature of key agreement protocols that gives assurances that session keys will not be compromised even if the private key of the server is compromised. All operations performed at an SAMS on behalf of a client may be logged by an audit log manager of the SAMS, so that a complete record of the creation, accesses and updates of encrypted client data as well as other artifacts can be provided if desired by an SAMS client. In some embodiments, DMIS audit log managers may make use of SAMS audit log management features to provide information about the use of registry-supplied credentials used for administrative operations. Key rotation policies may be selected by SAMS clients in some embodiments, e.g., to ensure that a different key is required for decrypting an artifact after every T seconds/minutes/hours, so that the time period for which a given key can be used for decryption is limited.

In at least some embodiments, a client may submit a programmatic request to the SAMS 131 to generate and store a CMK for the client, in effect creating a top-level container for cryptographic artifacts (such as registry-supplied keys) of the client. Using an HSM-managed resource group key (HGK) (corresponding to a subset of HSMs and associated request handlers, referred to collectively as an HSM resource group), an initial HSM backing key (HBK) may be created when the SAMS receives a request for a CMK, and placed in the container corresponding to the CMK. To enable the client to refer to the CMK for subsequent requests (e.g., for storing and retrieving registry-supplied credentials), a CMK identifier may be provided to the client. The HBKs may only be resident at the HSM layer, and may be used to perform various cryptographic tasks at the HSMs. HBKs may be considered the equivalent of a version of the CMK, and new HBKs may be created and associated with the given CMK periodically based on key rotation policies in some embodiments. Data encryption keys, used once per encryption and regenerated on decryption, may be derived from an HBK in some embodiments. 256-bit AES-GCM (Advanced Encryption Standard-Galois Counter Mode) keys may be used for various types of artifacts at the SAMS in some embodiments.

In at least some embodiments, a number of other services of the provider network 102 may be used directly or indirectly by the DMIS 150. For example, the provider network may include a virtualized computing service (VCS) which allows compute instance network isolation at various levels (e.g., using virtual private networks or VPCs). At least some of the DMIS agents may comprise compute instances of such a VCS in one embodiment, and the network isolation techniques supported by the VCS may be used to ensure that registry credentials cannot be transmitted to unauthorized destinations from the agents. Other provider network services utilized by the DMIS may include one or more database services (e.g., for storing DMIS configuration information), a certificate management service, a load balancing service (e.g., to distribute domain management requests among agents), a web application firewall service (e.g., to help secure DMIS request handler web applications), notification or message queue services (e.g., to inform clients regarding registry-initiated communications), logging, metrics and monitoring services, software development and deployment services (used to generate and deploy the software used for the DMIS itself), and so on. In various embodiments, the use of such provider network services, which have been proven to be highly secure, fault-tolerant and scalable over years of use by thousands of customers, for performing aspects of domain administration may ensure that DMIS clients' access to registries remains highly available, secure and performant as well.

In some embodiments, a hybrid approach may be used by some registrants, with the DMIS being used as an intermediary for administration of some domains, while traditional approaches being used for other domains. For example, a given client of a DMIS may obtain and store registry credentials for one set of domains at a secure repository of the client's choice (and use the DMIS as an intermediary as described above for administration tasks for that set of domains), but may let a traditional registrar obtain, store and use registry credentials for another set of domains of the client.

Overview of DMIS Request Processing Operations

Figure 2:
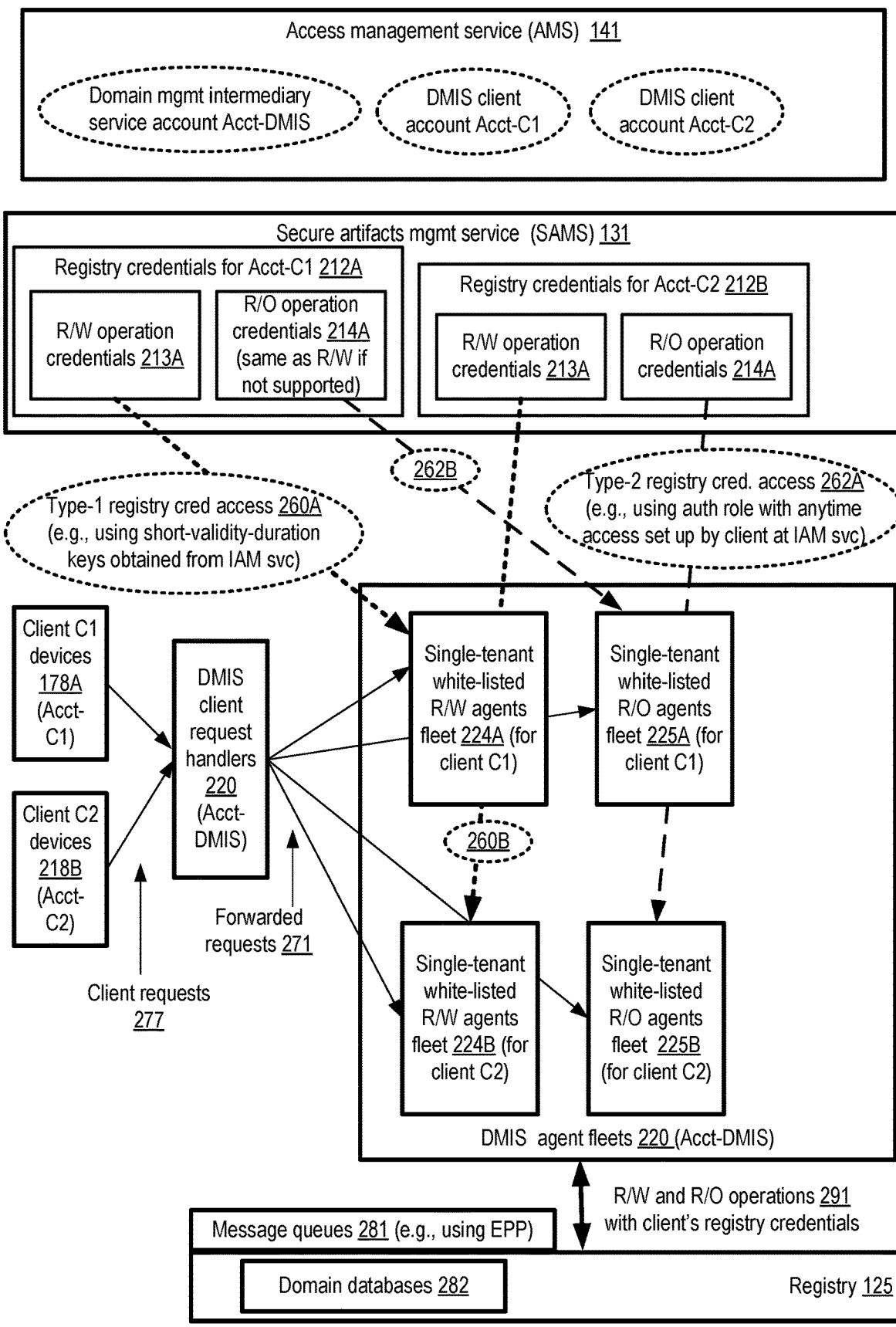
FIG. 2 illustrates an overview of the processing of domain name management requests with the help of a domain management intermediary service, according to at least some embodiments.

FIG. 2 illustrates an overview of the processing of domain name management requests with the help of a domain management intermediary service, according to at least some embodiments. In the depicted embodiment, an access management service (AMS) 141 may be used to store account information for various entities interacting with a provider network at which a DMIS similar in features and functionality to DMIS 150 of FIG. 1 is implemented. By way of example, information and operations associated with two clients of a DMIS, referred to as clients C1 and C2 respectively, are illustrated in FIG. 2; in practice, a DMIS may support large numbers (e.g., thousands or tens of thousands) of clients with respective groups of one or more domain names which have to be managed.

In the embodiment depicted in FIG. 2, the access management service (AMS) 141 contains metadata (e.g., account roles, permissions, etc.) associated with an account created for the DMIS itself (referred to as Acct-DMIS), and respective accounts Acct-C1 and Acct-C2 created for each of the two example clients C1 and C2. At a secure artifacts management service (SAMS) 131, similar in functionality to SAMS 131 of FIG. 1, each of the clients C1 and C2 may store respective sets of registry credentials obtained from a registry 125. Depending on whether the registry 125 provides support for read-only operation specific credentials or not, one or two types of credentials may be stored by the clients at SAMS 131 in different embodiments. For example, registry credentials 212A, for client account Acct-C1 of client C1, may include R/W operation credentials 213A and R/O operation credentials 214A (if the latter type of credentials are supported); similarly, registry credentials 212B, for client account Acct-C2 of client C2, may include R/W operation credentials 213B and R/O operation credentials 214B if supported. If no support for separate R/O and R/W credentials is provided, common credentials may be used for both types of operations.

Requests 277 for domain administration operations may be submitted from client devices 178A (which are owned by or allocated to client C1, and running programs associated with account Acct-C1) or 178B (which are owned by or allocated to client C2, and running programs associated with account Acct-C2) in the depicted embodiment. The requests may be processed at one or more DMIS client request handlers 220, at which programs run under the Acct-DMIS account.

Depending on whether a request is for an R/W operation or a read operation, and based on which client submits the request, a corresponding agent may be selected from DMIS agent fleets 220; each of the agents themselves may include programs running under the Acct-DMIS account with respect to the AMS 141. Respective fleets of single-tenant R/W agents and R/O agents, which have already been whitelisted by registry 279, may be used for each of the clients in the depicted embodiment. For example, R/W agents fleet 224A may be set up for client C1, R/W agents fleet 224B may be set up for client C2, R/O agents fleet 225A may be set up for client C1, and R/O agents fleet 225B may be set up for client C2. In other embodiments, at least a subset of the agents (R/O agents and/or R/W agents) may be configured in a multi-tenant mode, and a single such agent may potentially initiate domain administration operations on behalf of multiple clients of the DMIS.

Different techniques may be employed in the depicted embodiment for acquiring registry-supplied credentials for R/W operations than are employed for acquiring registry-supplied credentials for R/O operations. In a Type-1 registry credential access (such as 260A or 260B), a short-validity-duration key obtained by an R/W agent from the AMS 141 using client credentials indicated in the R/W operation request may be used to obtain R/W credentials. In a Type-2 registry credential access, such as 262A or 262B, an authorization role with "anytime" access set by the client at the AMS 141 may be used to obtain read credentials (e.g., wither R/O credentials, or the same credentials as are used for R/W operations if separate R/O credentials are not supported by registry 279).

The obtained credentials may be used by the agents to perform the requested operations at registry 279. In the case of R/W operations, contents of domain databases 282 maintained at the registry may be modified in the depicted embodiments, and the status information pertaining to the R/W operations may be provided via messages inserted into message queues 281 (e.g., using EPP or other protocols). The R/O agents for each client may poll the message queues to obtain status information and/or other messages sent by the registry in various embodiments.

Preliminary Setup Procedure Message Flow

Figure 3:
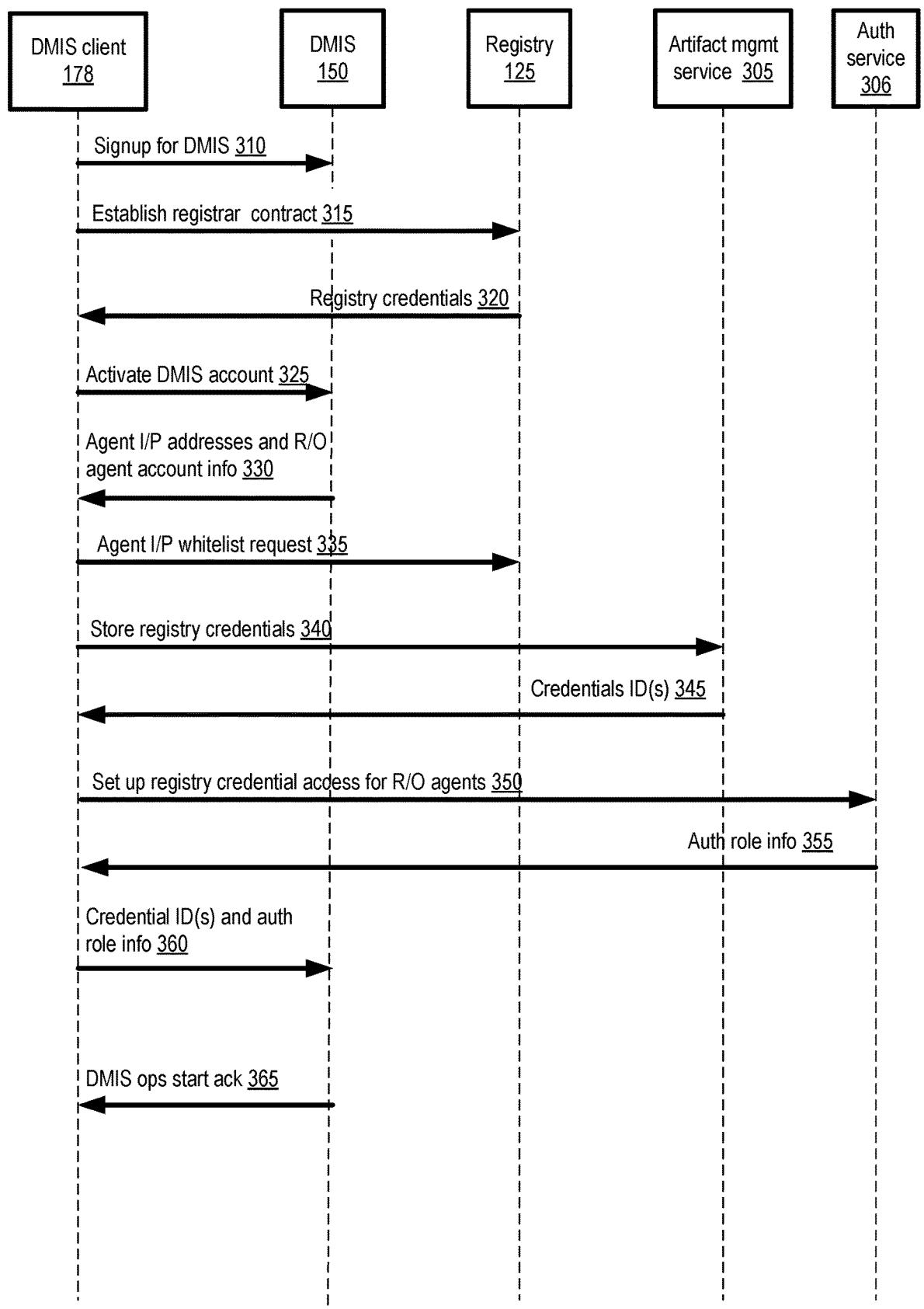
FIG. 3 illustrates example preliminary programmatic message flows to enable a domain management intermediary service to perform operations on behalf of a client, according to at least some embodiments.

As mentioned earlier, in various embodiments DMIS clients, the DMIS itself, as well as one or more accredited registries utilized for the domain names of the DMIS clients may participate in a setup procedure before requests for domain administration can be processed at the DMIS. FIG. 3 illustrates example preliminary programmatic message flows to enable a domain management intermediary service to perform operations on behalf of a client, according to at least some embodiments. At least a subset of the messages shown in FIG. 3 may be transmitted via respective programmatic interfaces implemented by the entities involved, such as a DMIS 150, a registry 125, an artifact management service 305 and an authorization management service 306.

A DMIS client 178 may submit a request 310 to sign up or register for the services of the DMIS 150 in the depicted embodiment; in response, an account may be created for the DMIS client at DMIS control plane components, or information about an existing account of the DMIS client (for example, an account already set up for the DMIS at an access management service) may be obtained at the DMIS control plane. The DMIS client 178 may also use one or more messages 315 to establish a contractual relationship 315 with a registry 125; as a result of this contractual relationship, a set of registry credentials 320 may be provided by the registry 125 to the DMIS client 178. As mentioned earlier, in some embodiments, separate sets of credentials may be provided for read-only versus read-write operations; read-write operations may result in modifications to the contents of domain related databases stored at the registry 125, while read-only operations may not lead to such modifications. In other embodiments, a common or shared set of credentials may be provided for all types of operations to be initiated at the registry by the recipient DMIS client.

In some embodiments, the DMIS client 178 may submit a request 325 to activate the DMIS client's account. In response, a set of resources such as respective pools of read-write agents and/or read-only agents may be designated or configured for the client. In the embodiment depicted in FIG. 3, network addresses (e.g., I/P addresses) of the agents may be sent to the client via one or more messages 330. In addition, in at least some embodiments, an identifier of a DMIS account used for various network-accessible services (similar to Acct-DMIS discussed in the context of FIG. 2) may also be provided in messages 330 to the DMIS client. This DMIS account may be used by the agents set up on the client's behalf, e.g., to access registry-supplied credentials stored within artifact management service 305, and providing the account identifier may enable the DMIS client to set up roles or other mechanisms that allow at least the R/O agents to obtain the registry-supplied credentials. In effect, the DMIS 150 may transmit one or more programmatic requests to the client 178 to obtain access to read-only credentials for the read-only agents, with identification information of the read-only agents being included in the request. In some embodiments, a different set of policies may be used (e.g., using an access management service of the kind described above) to restrict the set of administration operations that a given user of the DMIS may request via programmatic interactions—some users may be allowed to request a different set of domain administration operations than others. In one embodiment, additional access control policies may be applied to the registry credentials themselves, so that for example some DMIS are granted access to read-only credentials, other DMIS users are granted access to both read-write and read-only credentials, and so on.

As part of the preliminary procedures, the DMIS client 178 may submit one or more whitelist requests 335 to the registry 125 in the depicted embodiment. Whitelisting the network addresses of the agents set up on behalf of the client may enable subsequent messages sent by the agents to be accepted at the registry 125 in various embodiments; if the agent's addresses are not whitelisted, their messages to the registry 125 would be discarded/rejected by the registry in at least some implementations.

A DMIS client 178 may use one or more messages 340 to store the registry credentials securely at an artifact management service 305 in some embodiments. Identifiers created for the credentials may be provided by the artifact management service 305 to the DMIS client 178 in one or more messages 345. The DMIS client 178 may then set up registry credential access (at least for read-only operations) by requesting that a role be created at the authorization management service 306, with rights to access the registry credentials whose identifiers are indicated in the message(s) 350. Information about the authorization roles created in response may be provided to the DMIS client 178 in one or more messages 355 in the depicted embodiment. The credential identifiers and the authorization role information may then be sent by the DMIS client 178 to the DMIS 150 in one or more messages 360, thereby indicating to the DMIS that access to the registry credentials has been granted to the read-only agents. In at least some embodiments, a message indicating that the agents' IP addresses have been whitelisted may also be sent by the client to the DMIS, or confirmation of the whitelisting may be indicated in message 360.

At this point, all the information needed to start processing R/W and R/O requests from the DMIS client by the DMIS agents may have been provided to the DMIS 150 in the depicted embodiment. Accordingly, the DMIS agents setup for the DMIS client 178 may begin performing their functions (e.g., waiting for requests from the DMIS client, and/or polling registry message queues) in various embodiments, and a message 365 indicating that the agents have started their work may be sent to the DMIS client in at least some embodiments. Note that in some embodiments, one or more of messages of the preliminary procedure may be sent in a different order than that shown in FIG. 3; for example, messages 315 and 320 may be sent and received before messages 310.

Message Flow for Processing R/W Operations

Figure 4:
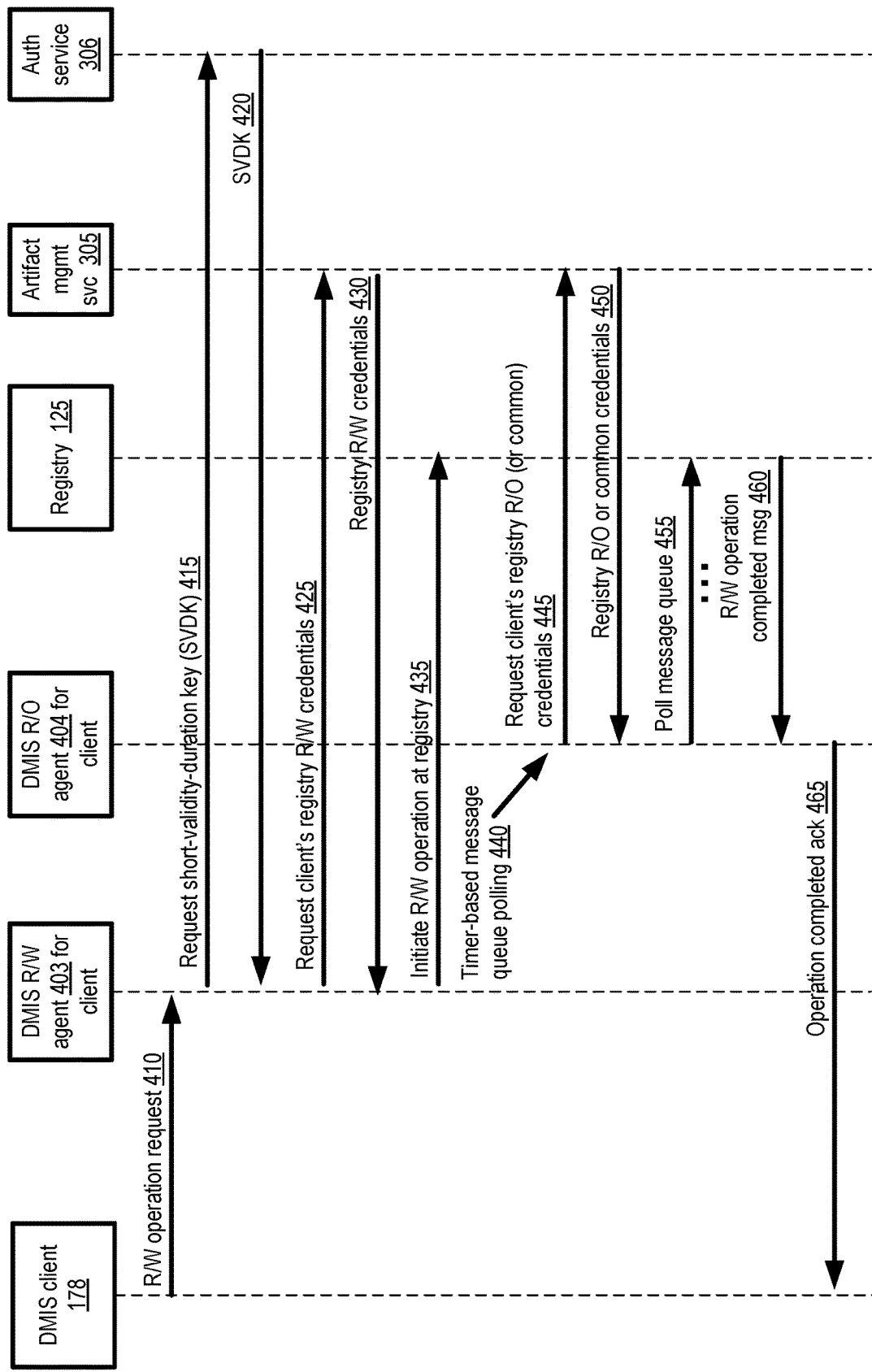
FIG. 4 illustrates example message flows involved in processing read-write registry operations at a domain management intermediary service, according to at least some embodiments.

FIG. 4 illustrates example message flows involved in processing read-write operations at a domain management intermediary service, according to at least some embodiments. A DMIS client 178 may use one or more messages 410 to submit a read/write (R/W) operation request to the DMIS in the depicted embodiment; the request may for example be processed initially at a request handler of the DMIS (not shown in FIG. 4) and forwarded to an agent 403 of the DMIS R/W agent fleet set up earlier (e.g., as part of the procedure illustrated in FIG. 3) on behalf of the client 178.

The R/W operation request may include or be usable to access information about the requesting client, including credentials associated with the requesting client's account an at authorization service 306 in the depicted embodiment. Using these client credentials, the R/W agent 403 may send a request 415 for a short-validity-duration key (SVDK) to the authorization service 306, and a corresponding SVDK may be sent to the R/W agent 403 in message 420. In effect, the SVDK may enable the R/W agent to request operations at one or more other services on behalf of the DMIS client 178, as though the DMIS R/W agent had the same rights and privileges as the DMIS client 178, for a short period of time (e.g., a few seconds) in the depicted embodiment, after which the R/W agent's authorization to act as the DMIS client expires.

Before the SVDK expires, the R/W agent 403 may submit a request message (or messages) 425 to artifact management service 305, and retrieve the registry credentials for R/W operations (which were stored at the artifact management service earlier by the DMIS client as part of the preliminary procedure discussed in the context of FIG. 3) in one or more response messages 430. Using the R/W credentials in one or more messages 435, the R/W agent 403 may initiate the requested operations at the registry 125 in the depicted embodiment.

In at least some embodiments, the registry 125 may not provide an immediate or synchronous response to the requests for the R/W operation. Instead, the registry 125 may submit messages to a message queue indicating the completion status of the R/W request in the depicted embodiment. Other mechanisms which require information to be read at the initiative of the DMIS or registrant, instead of being sent directly to the requester of the R/W operation, may be employed in different embodiments. In the embodiment depicted in FIG. 4, such status information may be retrieved by an R/O agent 404 set up on behalf of the DMIS client 178.

In the embodiment depicted in FIG. 4, timer-based message queue polling may be performed by the DMIS R/O agents, as indicated by arrow 440. This type of polling may be performed automatically by the R/O agents, e.g., without requiring any per-poll-operation triggering messages from other parts of the system. In some embodiments, communication mechanisms other than message queues may be used and/or polled. 178

In order to check the status information, the R/O agent 404 may request the client's R/O credentials (or, if the registry does not support separate R/O and R/W credentials, the common credentials required for both R/W and R/O operations) from the artifact management service 305 via messages 445. An authorization role created for the R/O agents by the DMIS client 178 and associated permissions designated for the role (e.g., as part of the preliminary procedure discussed in the context of FIG. 3) may be used to obtain the credentials, which may be sent back to the R/O agent in one or more messages 450. The R/O agent may then poll the registry message queue via one or more messages 455. In some embodiments, multiple status updates may be retrieved from the message queue before the processing of the R/W operation is completed at the registry. A message 460 may be retrieved from the message queue, indicating the final disposition of the R/W request (e.g., success or failure), and a corresponding message 465 acknowledging the status may then be sent back to the client 178 in the depicted embodiment.

Message Flow for Processing R/O Operations

Figure 5:
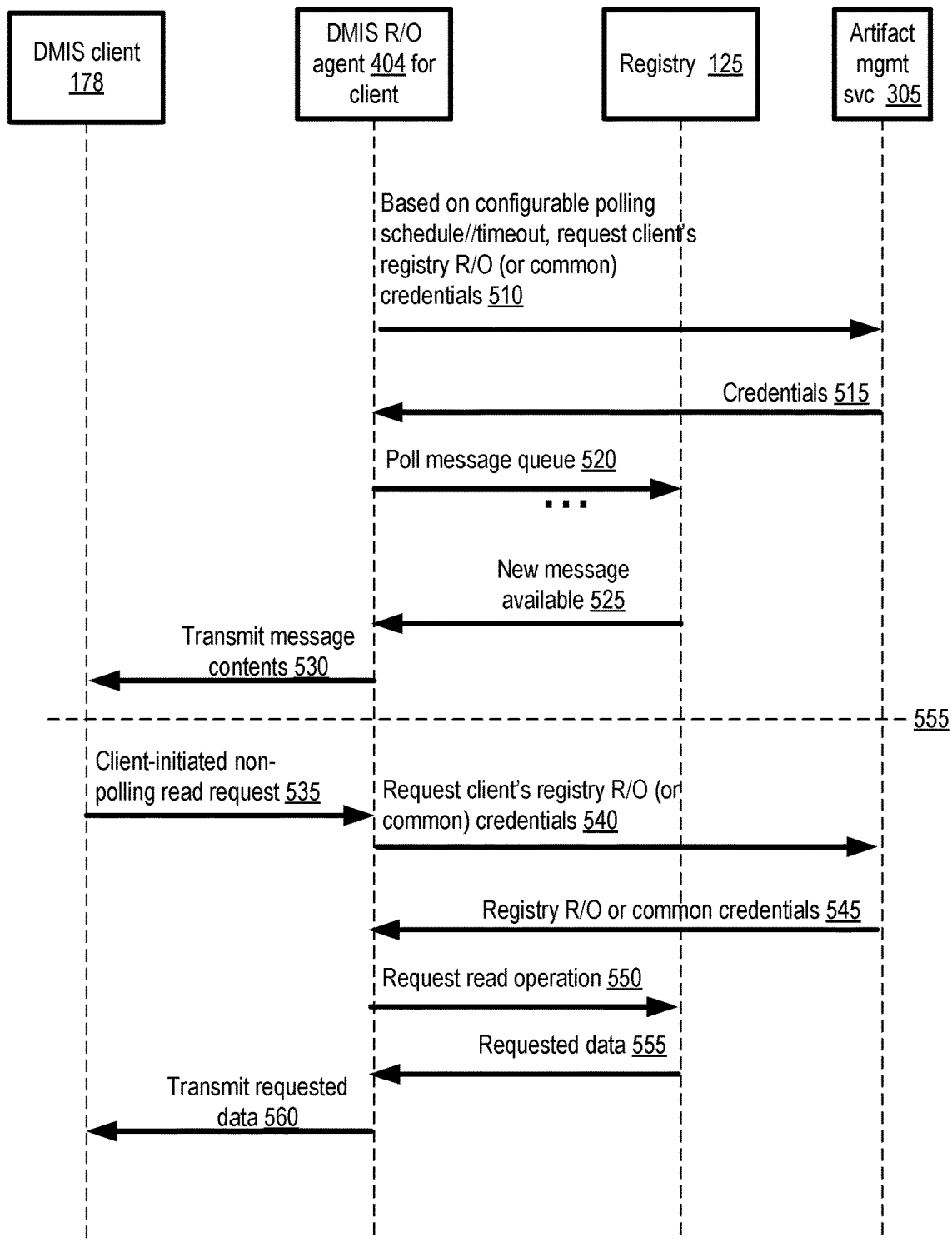
FIG. 5 illustrates example message flows involved in processing read-only registry operations at a domain management intermediary service, according to at least some embodiments.

FIG. 5 illustrates example message flows involved in processing read-only operations at a domain management intermediary service, according to at least some embodiments. Two types of read-only operations are illustrated in FIG. 5: message queue polling operations (which are performed without being triggered by specific requests from the DMIS client 178) shown in the upper part of FIG. 5, and other read requests which are triggered by specific requests from the DMIS client 178 which are shown in the lower part of FIG. 5, below the line labeled 555.

For message queue polling operations, which may for example be used to retrieve status information about R/W operations, or to retrieve messages sent by the registry to the registrant (the DMIS client), one or more configurable parameters may be set in the depicted embodiment. Such parameters, which may in some cases be set in response to programmatic requests from the DMIS client 178, may include a schedule or timeout parameter indicating how often (e.g., once every T minutes or seconds, or smaller or larger units of time) message queues used by the registry for various domains should be checked. Note that the parameter may be modified dynamically at the request of the DMIS client 178 in at least some embodiments, as discussed in the context of FIG. 6 below. Based on such a parameter, a particular R/O agent set up on behalf of the DMIS client 178 may request the client's R/O credentials (or common credentials if separate R/O credentials are not supported) for registry operations from the artifact management service 305 using a message 510 in the depicted embodiment. An authorization role created (e.g., during preliminary procedures similar to those shown in FIG. 3) by the DMIS client may be used to obtain the credentials in some embodiments. The credentials may be provided from the artifact management service 305 in one or messages 515. The message queue(s) of the registry 125 may then be polled using the credentials, as indicated by arrow 520. When a new message 525 becomes available, its contents may be read and transmitted via message 530 to the DMIS client. The polling may continue, with new iterations being scheduled based on the configurable parameter.

If and when a DMIS client 178 submits a non-polling read request 535, operations similar to those discussed with respect to message 510 onwards may be performed in response, without taking a polling frequency or interval parameter into account. Credentials may be requested from the artifact repository 305, obtained via one or more messages 545 at the R/O agent 404, and used to submit a read request 550 to the registry 125. The requested data may be obtained by the R/O agent 404 in one or more messages 555, and transmitted to the DMIS client via one or more messages 560.

Message Flows for DMIS Configuration Operations and Miscellaneous Requests

Figure 6:
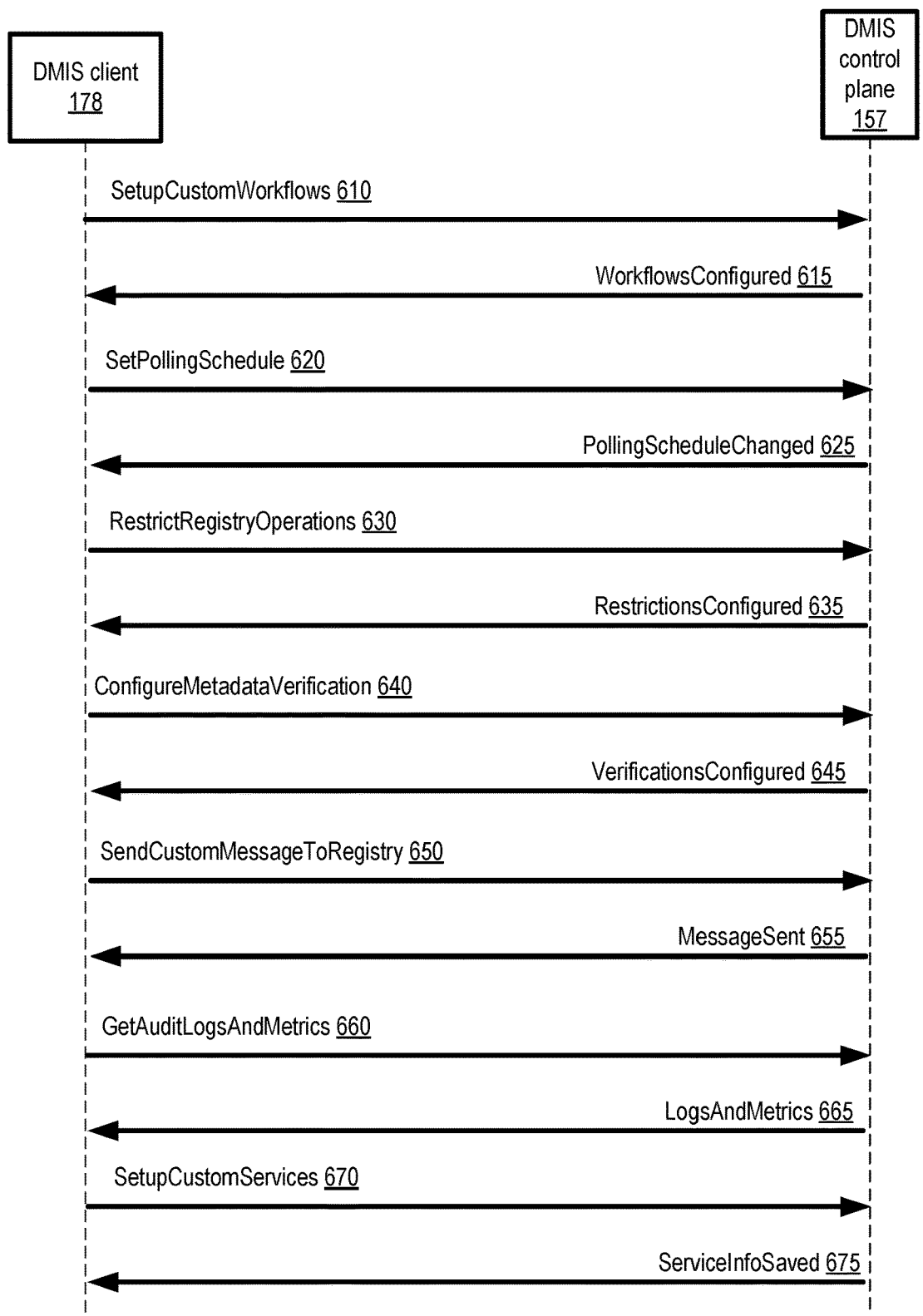
FIG. 6 illustrates example message flows for configuration-related operations and miscellaneous requests at a domain management intermediary service, according to at least some embodiments.

FIG. 6 illustrates example message flows for configuration-related operations and miscellaneous requests at a domain management intermediary service, according to at least some embodiments. Such messages may be sent by a DMIS client 178 via the DMIS's programmatic interfaces to the DMIS control plane 157 in the depicted embodiment, and may be used to indicate client preferences regarding various aspects of the domain administration operations being performed, or to retrieve some types of metadata and metrics maintained at the DMIS itself In some embodiments, a DMIS client 178 may request the setting up of custom workflows for at least some categories of administrative tasks as discussed earlier, e.g., using SetupCustomWorkflows requests 610. The programmatic interfaces provided by the DMIS may include a graphical workflow design tool in some embodiments which may be used to define the steps of such workflows. In response, the provided workflow information and definitions may be stored at the DMIS, and a WorkflowsConfigured message 615 may be sent to the client 178 in some embodiments.

In embodiments in which registry message queues have to be checked or polled to obtain information directed from the registry to the DMIS client, the DMIS client 178 may submit a SetPollingSchedule request 620 indicating, for example, how frequently one or more of the message queues are to be checked on behalf of the client. In some embodiments, the scheduling preferences may not necessarily be limited to a single interval value; instead, for example, the DMIS client may indicate that during some hours of specified days, polling should be performed every T1 minutes, while during other hours, polling should be performed every T2 minutes. Different schedules may also be specified for different domains being managed in behalf of the same DMIS client 178 in one embodiment. The DMIS may store the supplied scheduling parameters/preferences, which may be referred to as registry message check scheduling parameters, and send a PollingScheduleChanged message 625 to the client in the depicted embodiment. The registry check scheduling parameters may be used to determine the timings of periodic read operations by the R/O fleet to check whether any new messages for the client have been generated at one or more registries being used by the client.

In some embodiments, a DMIS client may wish to restrict the sets of operations that the DMIS is permitted to initiate with respect to one or more domain names, e.g., without manual approval from an authorized entity specified by the DMIS client 178. Such restriction preferences may be submitted via one or more RestrictRegistryOperations messages 630, and a RestrictionsConfigured response message 635 may be sent to the client from the DMIS control plane 157. After such a restriction request has been processed, requested operations which are not part of the restricted set may be rejected at the DMIS in various embodiments. In some embodiments, some types of domain administration operations may be deliberately throttled or slowed down using such restriction requests—e.g., a particular kind of read-write operation may not be allowed for some selected period of time. In some cases, delays may be imposed by the DMIS before a given kind of change is applied to a particular domain, with the extent of the delay being based on the relative importance of the domain (longer delays may be imposed for more business-critical domains, for example, to help ensure that there is sufficient time for a cancellation of a requested change on a business-critical domain).

As mentioned earlier, in some embodiments, DMIS components (similar to the metadata validators 166 shown in FIG. 1) may be configured to check whether domain-related metadata stored at the DMIS matches corresponding metadata stored at a registry. DMIS client 178 may set up a metadata verification procedure at the DMIS by submitting a ConfigureMetadataVerification message 640 in the depicted embodiment. Message 640 may indicate, for example, the kinds of domain-related metadata which is to be checked, how frequently the metadata should be checked, and/or what actions are to be taken in the event that a mismatch is detected between the registry's version of the metadata and the DMIS version of the metadata. In some embodiments, the kinds of metadata to be checked may include, for example, domain status information for various domain names, domain creation and expiration dates, identifiers of name servers associated with the domains, and/or registrant contact information. The preferences indicated by the DMIS client 178 may be stored (and corresponding operations may be initiated) at the DMIS, and a VerificationsConfigured message 645 may be sent to the client in some embodiments.

In some embodiments, a DMIS client 178 may utilize the DMIS to send custom messages to a registry, e.g., via a SendCustomMessageToRegistry request 650. Such a message may be sent, for example, using the client's R/W credentials to indicate that a particular reported misuse/abuse of a domain name (which may have been sent to the registry directly) is in fact a false positive report, and that no action needs to be initiated by the registry in response to the reported misuse/abuse. Alternatively, such a custom message may be used to request specific actions from the registry in response to a misuse/abuse report which has been found to be valid in some embodiments. In at least some embodiments, the client may perform an analysis of the domain abuse report and send results of the analysis to the DMIS, and the DMIS may in turn send the analysis to the registry on behalf of the client.

In at least one embodiment, the DMIS may collect metrics pertaining to the domain administration tasks performed on behalf of the client, such as the number of such operations that were requested over time, the particular domain names for which such requests were processed, the responsiveness of the registries to the requests, and so on. Logs of various domain administration operation requests and completions of such requests may also be maintained at the DMIS in at least some embodiments. DMIS clients 178 may submit a GetAuditLogsAndMetrics request 660 to view such logs and/or metrics for one or more domain names in the depicted embodiment, and the requested metrics may be provided in the form of one or more LogsAndMetrics messages 665.

A DMIS client 178 may indicate one or more custom authenticators (e.g., authentication mechanisms or services external to the provider network at which the DMIS is implemented) to be used for the client's requests in some embodiments, e.g., using a SetupCustomServices request 670. In response, the DMIS may send a ServiceInfoSaved response message 675, indicating that the DMIS has stored the provided authenticator information and will use the specified authentication mechanisms for the client's requests. In some embodiments, a SetupCustomServices request 670 may also or instead be used to submit information about a custom artifact management service at which the registry-provided credentials of the DMIS client 178 are stored.

Other types of configuration-related programmatic interactions with the DMIS control plane 157, not shown in FIG. 6, may be supported in some embodiments.

Categories of Domain Administration Requests

Figure 7:
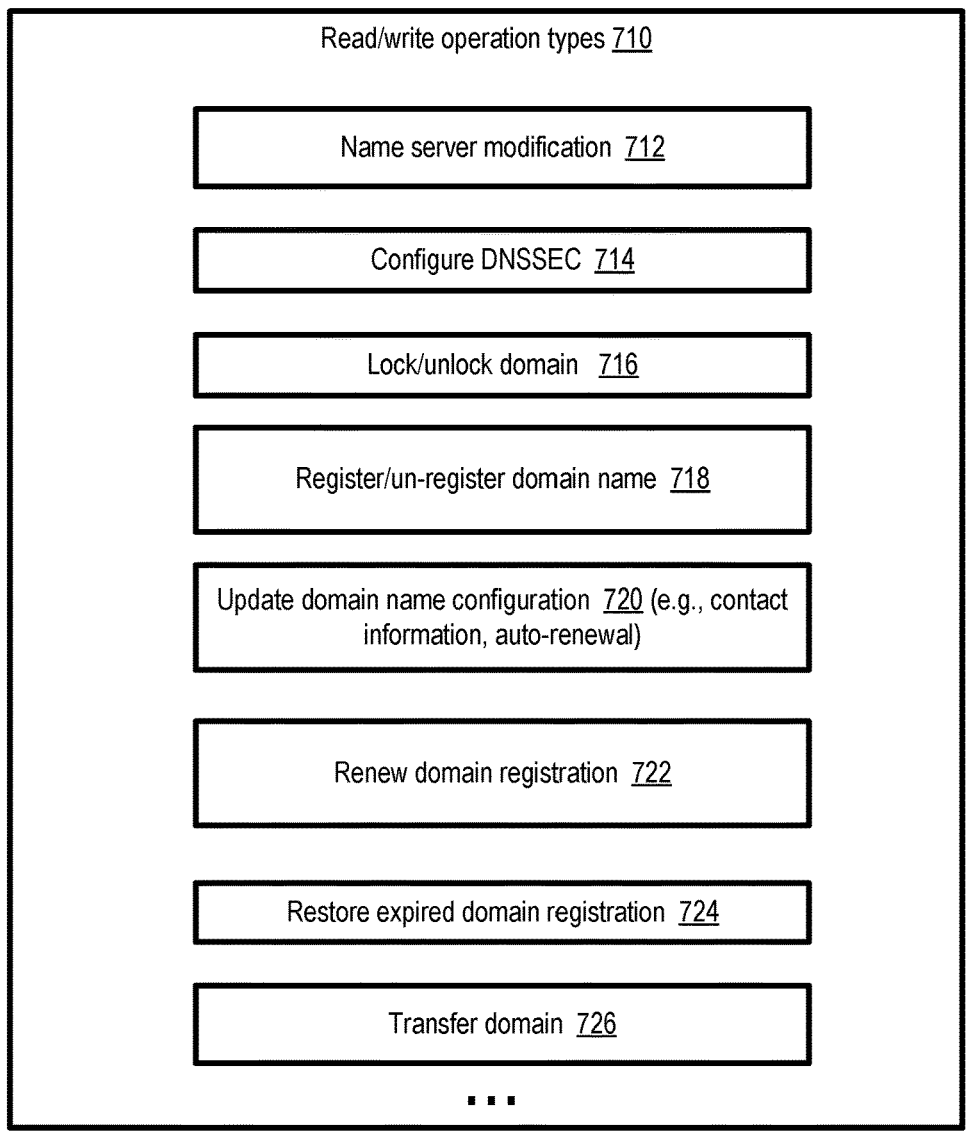
FIG. 7 illustrates example categories of domain administration operation requests which may be processed at a domain management intermediary service, according to at least some embodiments.
Figure 7:
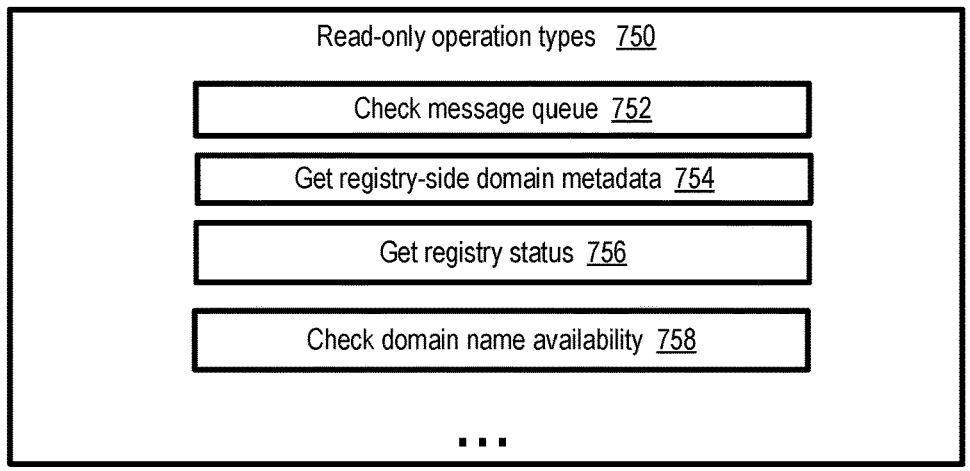

FIG. 7 illustrates example categories of domain administration operation requests which may be processed at a domain management intermediary service, according to at least some embodiments. As shown, a wide variety of read/write operation types 710 pertaining to domain administration may be handled by a DMIS. Name server modification requests 712 may be used, for example, to configure new name servers including so-called "root" name servers, to disable existing name servers, and the like. In some embodiments, clients may use the DMIS to configure DNSSEC (Domain Name System Security Extensions) 714 for their domains. DNSSEC is a suite of IETF (Internet Engineering Task Force) specifications for securing information provided by DNS, e.g., by providing origin authentication of DNS data to DNS clients, authenticated denial of existence, and data integrity. In one embodiment, clients may submit requests 716 to lock or unlock a domain. Locking a domain may, for example, result in preventing any changes to the domain until an unlock request is submitted.

Clients may register or un-register specified domain names using requests 718. In various embodiments, a registry may store various types of configuration data with respect to individual domain names, such as contact information of an individual responsible for the domain at the registrant entity/organization, whether the domain is to be automatically renewed, and so on. Such domain name configuration information may be updated using requests of type 720 in the depicted embodiments.

The registration of a particular domain may be renewed (e.g., prior to the expiration of the registration) using requests 722 in some embodiments. Domain registrations that have expired may be restored or refreshed using requests 724. Domains may be transferred from one registrant to another using requests 726 in some embodiments.

Several different kinds of read-only domain administration operations 750 may be supported at a DMIS in the embodiment depicted in FIG. 7. A client may submit a request 752 to check a message queue for messages pertaining to a domain name of the client, for example; such explicitly-requested checking of message queues may be performed in addition to regularly scheduled checking of the message queues in at least some embodiments. A request 754 to obtain the latest version of domain metadata stored at the registry (and hence referred to as "registry-side" metadata) may be submitted by a client in various embodiments; such registry-side metadata may then be compared with a DMIS version of the metadata to detect potential divergence between the two copies of the metadata, and to initiate remedial actions (such as rectifying/updating the metadata at one or both sided). Some registries may provide status information about the registries themselves (e.g., whether the registry is operating normally, whether a maintenance window is about to be entered, etc.) and such information could be retrieved by the DMIS in response to a registry status request 756 in some embodiments. In some embodiments, a read-only operation may comprise checking whether a candidate domain name is available 758. Other types of requests, not shown in FIG. 7, may also or instead be managed by the DMIS in some embodiments. In at least one embodiment, a client may specify a custom workflow to be implemented for one or more categories of requests, such as a workflow in which programmatic approvals from one or more parties other than the submitter of a given request have to be received at the DMIS before the DMIS sends the request on to the targeted registry.

Authentication Mechanisms

Figure 8:
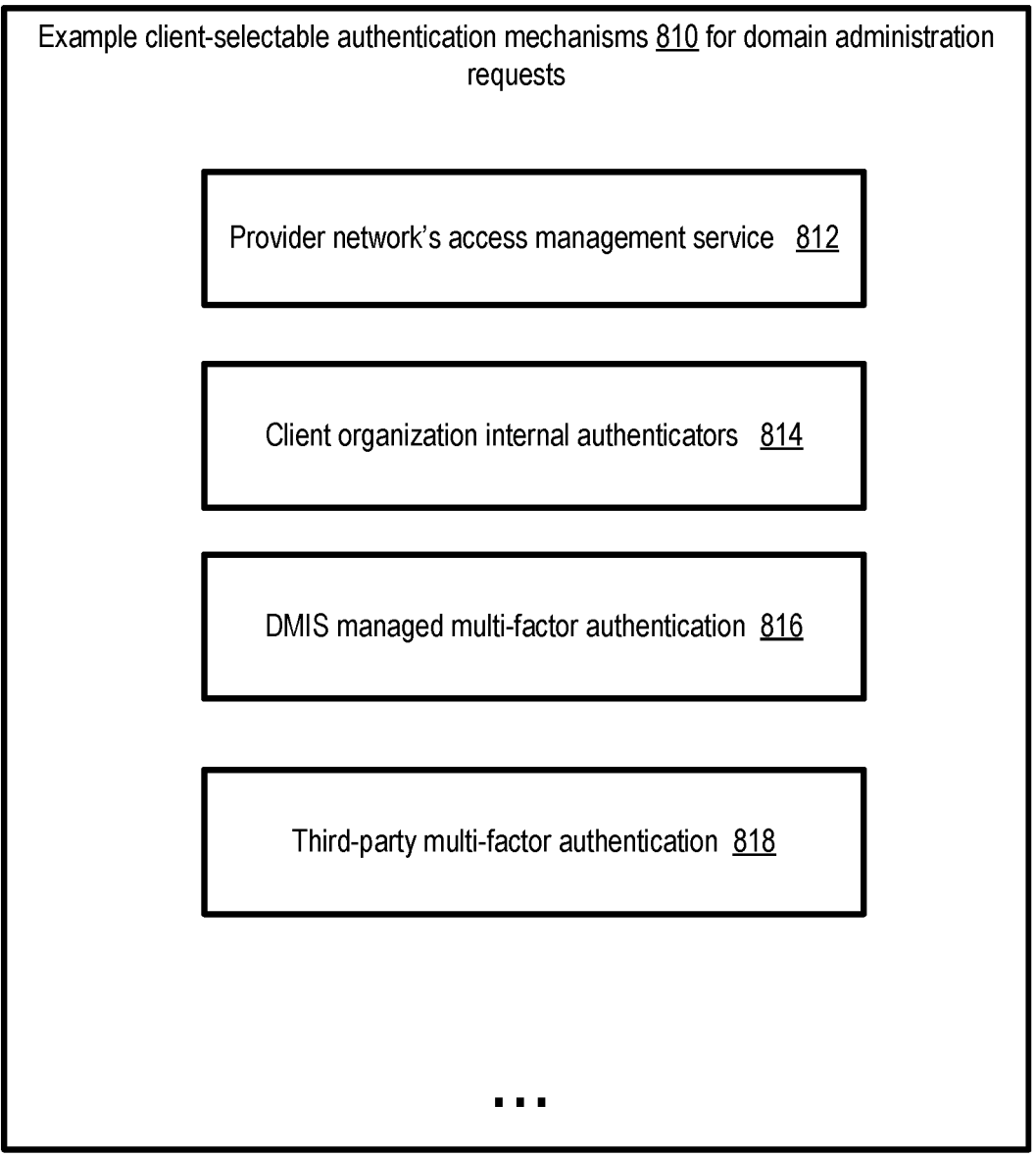
FIG. 8 illustrates example client-selectable authentication mechanisms which may be used for domain administration requests, according to at least some embodiments.

In at least some embodiments, requests submitted for domain administration by DMIS clients to the DMIS may be authenticated by entities independent of (i.e., not controllable by) the DMIS itself. FIG. 8 illustrates example client-selectable authentication mechanisms which may be used for domain administration requests, according to at least some embodiments. Any combination of one or more authentication mechanisms 810 may be utilized to prevent unauthorized or inauthentic domain administration operations in various embodiments.

In some embodiments, a provider network at which the DMIS is implemented may include an access management service 812 (similar in features and functionality to AMS 141 of FIG. 1), and such a service may be used to authenticate client requests directed to the DMIS. Some clients may already use the AMS for access to various other services (e.g., a virtualized computing service whose compute instances are used to run the client's applications, a storage or database service, and so on), so extending the use of the AMS for domain administration tasks may be relatively straightforward.

According to at least one embodiment, a client of the DMIS may utilize one or more internal authentication mechanisms within their organization, e.g., for document access control within the client's network. Such internal authenticators 814 may be used for certain categories of domain administrative tasks in some embodiments. The client may provide the DMIS the information necessary to connect to, and make use of, such client-side authenticators via one or more programmatic interactions.

In some embodiments, the DMIS may support multi-factor authentication 816 for its clients—e.g., clients may elect to use phone or email verification of administrative requests. In at least one embodiment, the DMIS may allow clients to utilize third-party multi-factor authentication mechanisms 818—e.g., one or more trusted entities external to the DMIS may be selected by the clients and used to verify the authenticity of client-submitted domain administration requests. Other types of authentication mechanisms may be employed in some embodiments.

In at least one embodiment, the DMIS may provide an indication of a default authentication mechanism (e.g., the AMS 812) to a client, e.g., when the client signs up for the DMIS, if the client does not wish to specify custom authentication techniques for the client's requests. In some embodiments, different authentication mechanisms may be selected by a client for respective categories of administration requests (such as those shown in FIG. 7). For example, a client may indicate that requests to change name servers, or to lock/unlock domains may require different authentication mechanisms than other types of requests.

Methods for Operations Performed at DMIS

Figure 9:
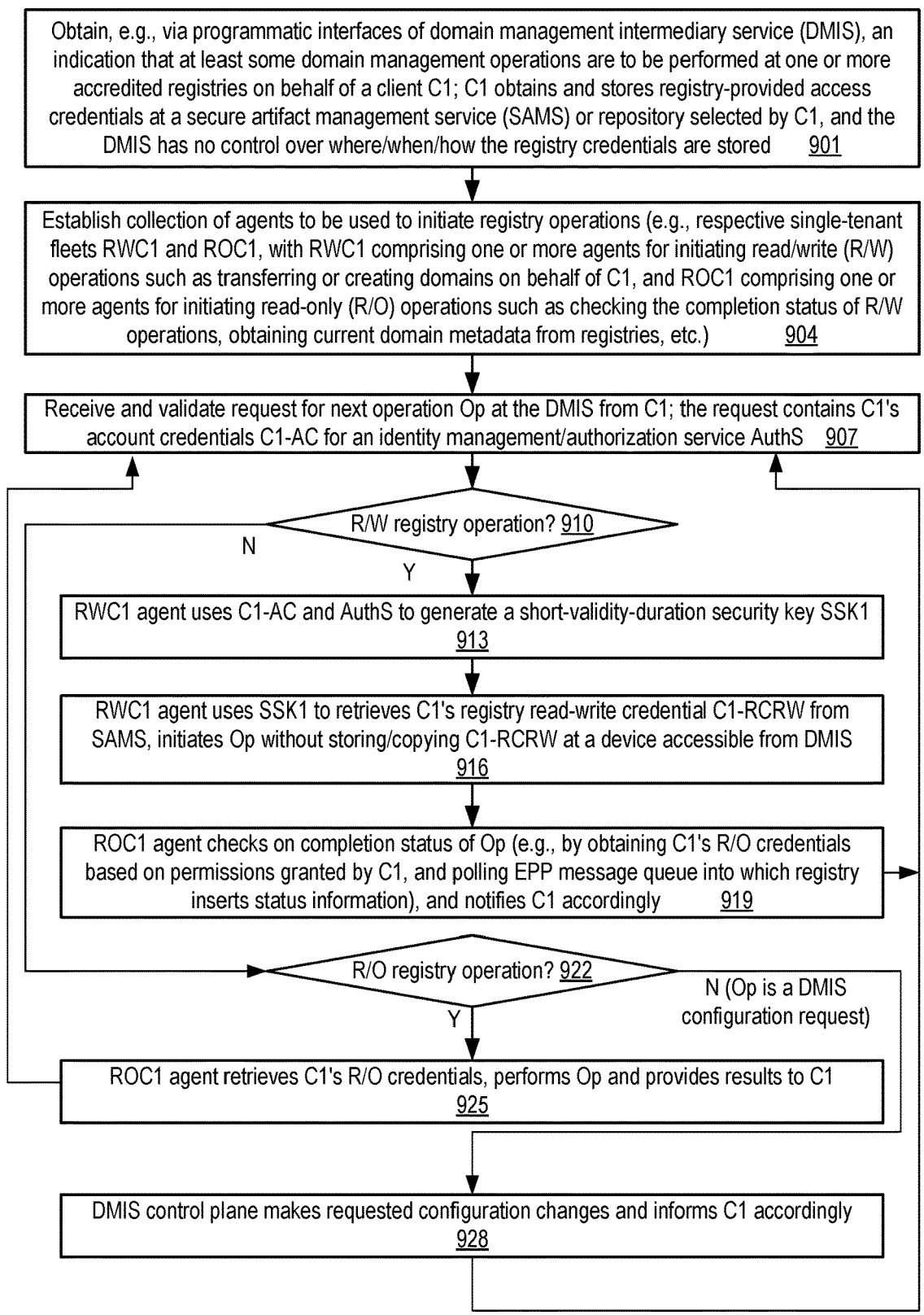
FIG. 9 is a flow diagram illustrating aspects of operations that may be performed at a domain management intermediary service, according to at least some embodiments.

FIG. 9 is a flow diagram illustrating aspects of operations that may be performed at a domain management intermediary service, according to at least some embodiments. As shown in element 901, an indication that at least some domain management operations are to be performed at one or more accredited registries on behalf of a client C1 may be obtained, e.g., via programmatic interfaces of domain management intermediary service (DMIS). As part of a preliminary setup phase prior to using the DMIS, C1 may obtain and stores registry-provided access credentials at a secure artifact management service (SAMS) or repository selected by C1 in various embodiments. The DMIS itself may have no control over where/when/how the registry credentials are stored or secured, and registry credential storage and security techniques may be selected by the client.

A collection of agents to be used to initiate registry operations on behalf of C1 may be established at the DMIS (element 904) in the depicted embodiment. For example, respective single-tenant fleets RWC1 and ROC1, with RWC1 comprising one or more agents for initiating read/write (R/W) operations such as transferring or creating domains on behalf of C1, and ROC1 comprising one or more agents for initiating read-only (R/O) operations such as checking the completion status of R/W operations, obtaining current domain metadata from registries, etc. may be set up.

The DMIS may perform at least three broad categories of operations on behalf of C1 in the depicted embodiment: R/W operations at the registry, R/O operations at the registry, and configuration/customization operations at the DMIS itself. A request for an operation (Op) may be received at the DMIS from the client (element 907). The request may include or contain C1's account credentials C1-AC for an access management or authorization service (AuthS) in at least some embodiments.

If the requested operation is a read-write operation (as determined in operations corresponding to element 910), an agent from RWC1 may use C1-AC and AuthS to generate a short-validity-duration security key SSK1 in the depicted embodiment (element 913). The agent may then use SSK1 to retrieve C1's credentials C1-RCRW from the security artifact management service (SAMS) (element 916), and initiate the read/write operation using C1-RCRW at the registry. C1-RCRW may not be stored at a device accessible from the DMIS, and the SSK1 key may expire shortly after it is used, ensuring that it can no longer be used to access C1-RCRW. Any of a wide variety of R/W operations may be requested by the client in various embodiments, including but not limited to (a) an operation to register a domain name, (b) an operation to transfer a domain name, (c) an operation to renew a domain name registration, (d) an operation to delete a domain name, (e) an operation to create a new contact (e.g., the name, email address, phone number etc. of an individual responsible for responding to queries pertaining to the domain name) associated with a domain name, (f) an operation to update information of a contact associated with a domain name, (g) an operation to update information of a domain name server or (h) an operation to configure DNSSEC (Domain Name System Security Extensions) for a domain name.

After the read-write operation has been initiated, an R/O agent from ROC1 may check on the completion status of the operation in the depicted embodiment (element 919)—e.g., whether the request completed successfully, remains in progress, failed, etc. The R/O agent may obtain C1's credentials for read-only tasks at the registry (which may be the same credentials as those used for R/W operations in some embodiments, or may differ from the credentials used for R/W operations) using permissions granted earlier to the R/O agents by the client C1. In at least some embodiments, the status may be checked by examining contents of a message queue in which the registry places outbound messages (formatted according to EPP or a similar protocol). In at least one embodiment, the message queues may be polled periodically on behalf of the client C1, e.g., with the timing of the polling being based at least in part on a scheduling parameter selected by C1 or a default scheduling parameter selected at the DMIS. The status information obtained by the R/O agent may be provided to client C1.

If the requested operation Op is a read-only operation (as detected in operations corresponding to element 922), an ROC1 agent may perform the requested read(s) after obtaining the necessary R/O (or common credentials) and provide the results to C1, as shown in element 925. The read-only operations performed to check on the status of an R/W operation may be performed without a corresponding request from the client as indicated above, e.g., as part of the normal operating procedure for handling R/W requests. Other R/O requests, at least some of which may be performed in response to explicit client requests, may include for example (a) obtaining metadata pertaining to a domain name from the registry, e.g., for determining whether a discrepancy or mismatch exists between the registry version of the metadata and the DMIS version, (b) obtaining contact information associated with a domain name, or (c) checking availability of a candidate domain name to be created on behalf of a client. In some cases, C1 may explicitly request the DMIS to check message queues to determine whether any messages have been directed to C1 from the registry.

If the requested operation is a configuration change, e.g., including some of the types of configuration operations discussed in the context of FIG. 6, the requested configuration changes may be performed at or by the DMIS control plane, and an indication of the completion of the changes may be provided to the client C1 (element 928) in the depicted embodiment. When the next operation request is received, operations corresponding to elements 907 onwards may be performed again to fulfill the request.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of utilizing an intermediary service for administration of at least a subset of the domain names of an organization may be extremely beneficial in a number of scenarios. Many organizations rely on the Internet for a substantial fraction of their customer interactions. As a result, the domain names used by the organizations to receive customer requests and provide responses to such requests may become closely tied to the "brand" of the organizations, and ensuring that network traffic directed to such domain names is not hampered may become critically important to the organizations. The registry credential isolation techniques described, in which respective single-tenant agent fleets are set up to perform domain administration tasks on behalf of registrants, without actually storing or retaining registry credentials—may ensure that undesired administrative operations become impossible or at least extremely difficult to achieve. At the same time, the use of provider network resources for the intermediary service may help ensure that request/response pathways for domain administration operations remain highly available.

Illustrative Computer System

Figure 10:
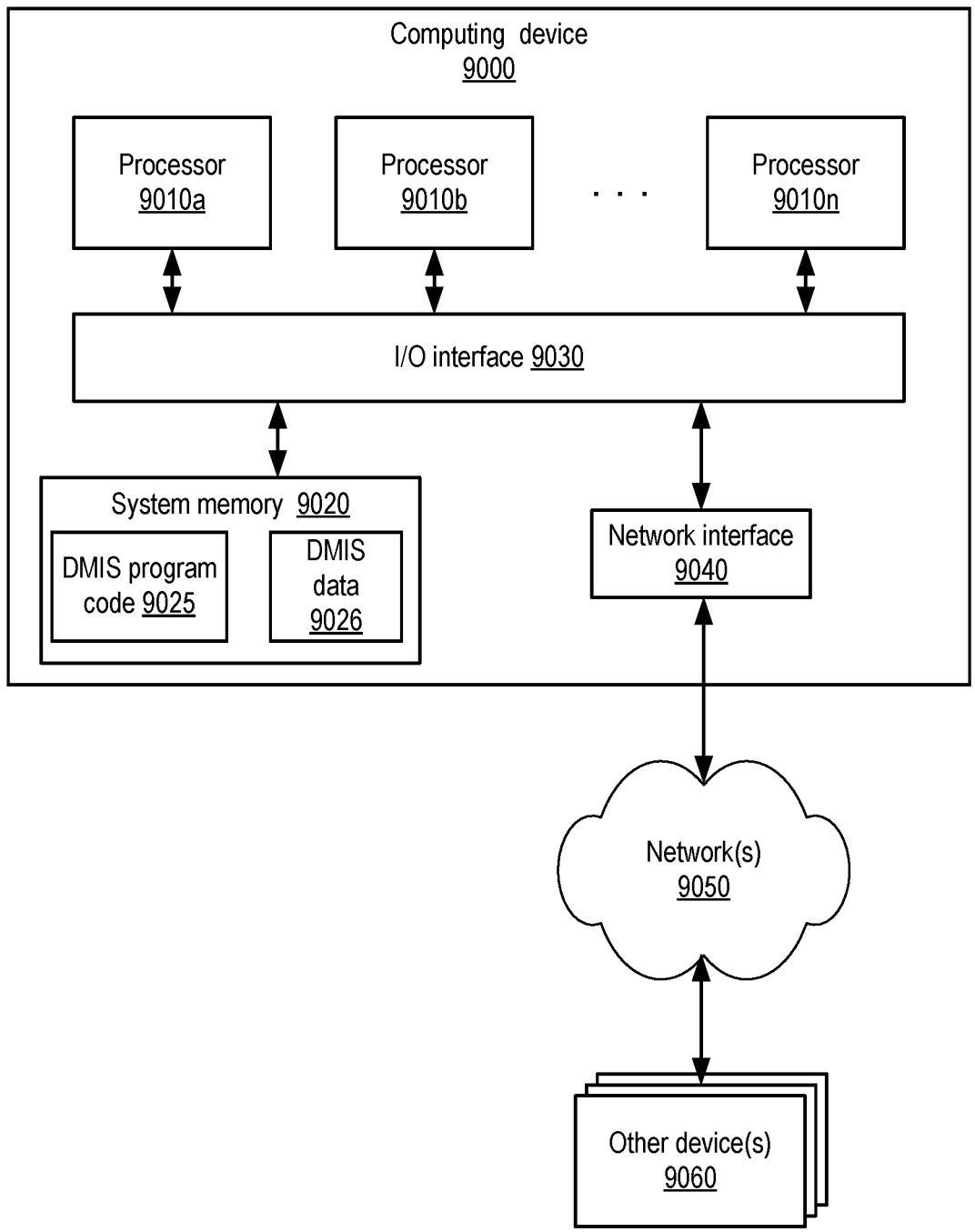
FIG. 10 is a block diagram illustrating an example computing device that may be used in at least some embodiments.

In at least some embodiments, a server that implements a portion or all of one or more of the technologies described herein, including the techniques for various elements of a domain management intermediary service, a security artifact management service, an authentication service and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as DMIS program code 9025 and DMIS data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a network-accessible domain management intermediary service in a provider network between domain name registrants and registries;
wherein to implement the domain management intermediary service, the one or more computing devices include instructions that upon execution on one or more processors cause the one or more computing devices to:
establish, at the domain management intermediary service of the provider network, (a) a first set of agents to perform read-write domain administration operations on behalf of a first one of the registrants, and (b) a second set of agents to perform read-only domain administration operations on behalf of the first registrant;
in response to a programmatic request from the first registrant for a read-write domain administration operation, cause a first agent of the first set of agents to:
generate, using a client credential indicated in the programmatic request, a short-validity-duration security key;
retrieve, using the short-validity-duration security key, a registry credential which was stored by a security artifact management service at request of the first registrant; and
utilize the registry credential to initiate the read-write domain administration operation at one of the registries, without storing the registry credential at a storage device accessible from the domain management intermediary service; and cause a second agent of the second set to:
  perform one or more read operations to determine a completion status of the read-write domain administration operation, using a permission granted to one or more agents of the second set at request of the first registrant; and
  provide an indication of the completion status of the read-write domain administration operation to the first client.

2. The system as recited in claim 1, wherein the one or more computing devices include further instructions that upon execution on the one or more processors further cause the one or more computing devices to:
  transmit, from the domain management intermediary service to the first client, a programmatic request to obtain the permission, wherein the programmatic request indicates identification information of one or more agents of the second set; and
  determine, at the domain management intermediary service, that the permission to has been granted to the one or more agents of the second set.

3. The system as recited in claim 1, wherein the one or more computing devices include further instructions that upon execution on the one or more processors further cause the one or more computing devices to:
  transmit, from the domain management intermediary service to the first client, a programmatic request indicating one or more network addresses of one or more agents of at least one set of the first and second sets; and
  determine, at the domain management intermediary service, that the one or more network addresses have been whitelisted at the registry.

4. The system as recited in claim 1, wherein the one or more computing devices include further instructions that upon execution on the one or more processors further cause the one or more computing devices to:
  cause the second agent to:
    perform one or more read operations to determine whether a first version of metadata pertaining to a particular domain of the first client differs from a second version of the metadata, wherein the first version is stored at the registry and the second version is stored at the domain management intermediary service; and
    provide, to the first client, an indication of whether the first version differs from the second version.

5. The system as recited in claim 1, wherein the one or more computing devices include further instructions that upon execution on the one or more processors further cause the one or more computing devices to:
  cause the second agent to:
    determine that the first client has specified a registry message check scheduling parameter; and
    periodically examine, based at least in part on the registry message check scheduling parameter, one or more message queues utilized by the registry to store messages directed to the first client.

6. A method, comprising:
performing, at one or more computing devices as part of a network-accessible domain management intermediary service implemented in a provider network:
  establishing, at the network-accessible domain management intermediary service, a first collection of one or more agents to perform domain administration operations on behalf of a first client;
  obtaining, by a first agent of the first collection of agents, using a client credential indicated in a programmatic request from the first client for a read-write domain administration operation, a security key;
  retrieving, by the first agent using the security key, a registry credential from an artifact repository;
  initiating, by the first agent, using the registry credential, the read-write domain administration operation at a registry; and
  providing an indication of a completion status of the read-write domain administration operation to the first client.

7. The method as recited in claim 6, wherein the first collection comprises a first group of one or more agents configured to initiate read-write domain administration operations on behalf of the first client, and a second group of one or more agents configured to initiate read-only domain administration operations on behalf of the first client, wherein the first agent is a member of the first group.

8. The method as recited in claim 6, further comprising performing, at the one or more computing devices:
  polling, by one or more agents of the collection, a message queue into which messages directed to the first client are inserted by the registry, wherein the indication of the completion status is obtained via said polling.

9. The method as recited in claim 6, further comprising performing, at the one or more computing devices:
  transmitting, from the domain management intermediary service to the first client, a programmatic request to grant access to a registry credential to be used to perform read-only domain administration operations; and
  determining, at the domain management intermediary service, that access to the registry credential has been granted to at least one agent of the first collection.

10. The method as recited in claim 6, further comprising performing, at the one or more computing devices:
  transmitting, from the domain management intermediary service to the first client, a programmatic request indicating one or more network addresses of one or more agents of the first collection; and
  determining, at the domain management intermediary service, that the one or more network addresses have been whitelisted at the registry.

11. The method as recited in claim 6, further comprising performing, at the one or more computing devices:
  establishing, at the domain management intermediary service, a second collection of one or more agents to perform domain administration operations on behalf of a second client, wherein individual agents of the second collection are designated for exclusive use on behalf of the second client.

12. The method as recited in claim 6, further comprising performing, at the one or more computing devices:
  utilizing, by one or more agents of the first collection, the extensible provisioning protocol (EPP) to communicate with the domain name registry.

13. The method as recited in claim 6, wherein the read-write domain administration operation comprises one or more of: (a) an operation to register a domain name, (b) an operation to transfer a domain name, (c) an operation to renew a domain name registration, (d) an operation to delete a domain name, (e) an operation to create a new contact associated with a domain name, (f) an operation to update information of a contact associated with a domain name, (g) an operation to update information of a domain name server or (h) an operation to configure DNSSEC (Domain Name System Security Extensions) for a domain name.

14. The method as recited in claim 6, further comprising performing, at the one or more computing devices:

initiating, by an agent of the first collection, a read-only domain administration operation on behalf of the first client, wherein the read-only domain administration operation comprises one or more of: (a) obtaining metadata pertaining to a domain name from the registry, (b) obtaining contact information associated with a domain name, (c) checking availability of a candidate domain name to be created on behalf of the first client, or (d) obtaining contents of a message generated at the registry and directed to the first client.

15. The method as recited in claim 6, wherein the read-write domain administration operation is directed to one of: a generic top-level domain, a country code top-level domain, or a third-level domain.

16. One or more non-transitory computer-accessible storage media storing program instructions that when executed on one or more processors cause one or more computer systems to:

obtain, by a first agent of a first collection of agents of a network-accessible domain management intermediary service implemented in a provider network to perform domain administration operations on behalf of a first client, using a client credential indicated in a programmatic request from the first client for a read-write domain administration operation, a security key;

retrieve, by the first agent of the domain management intermediary service using the security key, a registry credential from a location which was selected by the first client to store the registry credential;

initiate, by the first agent of the domain management intermediary service, using the registry credential, the read-write domain administration operation at a registry; and provide an indication of a completion status of the read-write domain administration operation to the first client.

17. The one or more non-transitory computer-accessible storage media as recited in claim 16, storing further program instructions that when executed on the one or more processors further cause the one or more computer systems to:

establish a first group of one or more agents as part of the first collection at the domain management intermediary service to perform read-write domain administration operations on behalf of the first client; and establish a second group of one or more agents as part of the first collection at the domain management intermediary service to perform read-only domain administration operations on behalf of the first client.

18. The one or more non-transitory computer-accessible storage media as recited in claim 16, storing further program instructions that when executed on the one or more processors further cause the one or more computer systems to:

obtain, via a programmatic interface, an indication of a restricted set of domain management operations to be performed on behalf of the first client; and reject a request to perform an operation which is not a member of the restricted set.

19. The one or more non-transitory computer-accessible storage media as recited in claim 16, storing further program instructions that when executed on the one or more processors further cause the one or more computer systems to:

obtain, at the domain administration intermediary service from the first client, an indication of an analysis of a domain abuse report; and transmit the indication of the analysis to the registry from the domain administration intermediary service.

20. The one or more non-transitory computer-accessible storage media as recited in claim 16, storing further program instructions that when executed on the one or more processors further cause the one or more computer systems to:

obtain an indication, via a programmatic interface, of a workflow to be implemented prior to performing a particular domain administration operation; and initiate the workflow prior to performing the particular domain administration operation.

* * * * *